United States Patent
Wang et al.

(10) Patent No.: US 11,690,028 B2
(45) Date of Patent: Jun. 27, 2023

(54) METHOD, USER EQUIPMENT AND BASE STATION FOR TRANSMITTING UPLINK SIGNALS

(71) Applicant: Samsung Electronics Co., Ltd., Suwon-si (KR)

(72) Inventors: Yi Wang, Beijing (CN); Shichang Zhang, Beijing (CN); Yingyang Li, Beijing (CN); Chengjun Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 17/222,906

(22) Filed: Apr. 5, 2021

(65) Prior Publication Data

US 2021/0227483 A1   Jul. 22, 2021

Related U.S. Application Data

(63) Continuation of application No. 16/518,749, filed on Jul. 22, 2019, now Pat. No. 10,972,989, which is a
(Continued)

(30) Foreign Application Priority Data

Jan. 29, 2015   (CN) .......................... 201510047497.7

(51) Int. Cl.
*H04W 56/00* (2009.01)
*H04W 74/00* (2009.01)
*H04W 74/08* (2009.01)

(52) U.S. Cl.
CPC ... *H04W 56/0005* (2013.01); *H04W 56/0045* (2013.01); *H04W 74/006* (2013.01); *H04W 74/0833* (2013.01)

(58) Field of Classification Search
CPC ......... H04W 56/0005; H04W 56/0045; H04W 74/006; H04W 74/0833; H04W 56/005
See application file for complete search history.

(56) References Cited

U.S. PATENT DOCUMENTS

| 8,675,605 | B2 | 3/2014 | Charbit et al. |
| 9,031,017 | B2 | 5/2015 | Ratasuk et al. |

(Continued)

FOREIGN PATENT DOCUMENTS

| CN | 103875187 A | 6/2014 |
| CN | 104094623 A | 10/2014 |

(Continued)

OTHER PUBLICATIONS

International Search Report dated May 18, 2016 in connection with International Patent Application No. PCT/KR2016/000944.
(Continued)

*Primary Examiner* — Diane L Lo
*Assistant Examiner* — Abusayeed M Haque

(57) ABSTRACT

The present disclosure provides several methods, user equipment (UEs) and base stations for transmitting uplink signals. After receiving uplink synchronization command information, the UE may transmit an uplink signal on at least one idle unlicensed cell. Besides, the UE may try to transmit the uplink signal on multiple uplink signal resources within an uplink signal transmission window. By using the present disclosure, transmission probability of uplink signals may be improved, and time delay of uplink synchronization may be shortened.

16 Claims, 23 Drawing Sheets

---

801 — UE receives from base station uplink synchronization command information, which at least includes resource allocation information of multiple uplink signals of a TAG 802 — select one or N1 uplink carriers from the TAG, based on the resource allocation information; transmit an uplink signal, when determining whether a first uplink signal resource subframe after subframe (n+k) of the one or N1 uplink carriers is idle; not transmit an uplink signal, when determining whether a first uplink signal resource subframe after subframe (n+k) of the one or N1 uplink carriers is not idle 803 — when UE transmits an uplink signal on at least one carrier, the UE receives a random access response; when not receiving the random access response within a predefined time, the UE starts to transmit a new uplink signal

Related U.S. Application Data continuation of application No. 15/547,795, filed as application No. PCT/KR2016/000944 on Jan. 28, 2016, now Pat. No. 10,362,545.

(56) References Cited

U.S. PATENT DOCUMENTS

| | | | |
|---|---|---|---|
| 9,226,290 B2 | 12/2015 | Gaal et al. | |
| 9,473,981 B2 | 10/2016 | Bhushan et al. | |
| 9,973,967 B2 | 5/2018 | Ratasuk et al. | |
| 10,362,545 B2 * | 7/2019 | Wang | H04W 74/0833 |
| 2010/0296467 A1 | 11/2010 | Pelletier et al. | |
| 2013/0203429 A1 * | 8/2013 | Kneckt | H04W 74/0816 |
| | | | 455/450 |
| 2013/0343288 A1 * | 12/2013 | Ratasuk | H04W 72/1215 |
| | | | 370/329 |
| 2014/0050194 A1 * | 2/2014 | Gaal | H04W 72/0453 |
| | | | 370/330 |
| 2014/0204854 A1 * | 7/2014 | Freda | H04L 5/0055 |
| | | | 370/329 |
| 2014/0341035 A1 * | 11/2014 | Bhushan | H04L 5/001 |
| | | | 370/235 |
| 2014/0341207 A1 * | 11/2014 | Bhushan | H04W 28/0252 |
| | | | 370/350 |
| 2014/0362780 A1 * | 12/2014 | Malladi | H04W 74/0808 |
| | | | 370/329 |
| 2015/0092703 A1 * | 4/2015 | Xu | H04W 28/18 |
| | | | 370/329 |
| 2015/0181589 A1 * | 6/2015 | Luo | H04L 27/0006 |
| | | | 370/329 |
| 2015/0358995 A1 * | 12/2015 | Li | H04L 5/0007 |
| | | | 370/329 |
| 2022/0149918 A1 * | 5/2022 | Miao | H04B 7/0695 |
| 2022/0159628 A1 * | 5/2022 | Bangolae | H04W 72/04 |

FOREIGN PATENT DOCUMENTS

| | | |
|---|---|---|
| KR | 10-2012-0003488 A | 1/2012 |
| WO | 2013/109049 A1 | 7/2013 |
| WO | 2014/023458 A1 | 2/2014 |
| WO | 2014/028908 A1 | 2/2014 |
| WO | 2014/189915 A2 | 11/2014 |

OTHER PUBLICATIONS

Written Opinion of the International Searching Authority dated May 18, 2016 in connection with International Patent Application No. PCT/KR2016/000944.

Supplementary European Search Report dated Jan. 4, 2018 in connection with European Patent Application No. 16 74 3709.

LG Electronics, "LBT operation details and initial evaluation results", 3GPP TSG RAN WG1 Meeting #79, Nov. 17-21, 2014, 7 pages, R1-144900.

First Office Action in connection with Chinese Application No. 201510047497.7 dated Aug. 6, 2020, 14 pages.

* cited by examiner

METHOD, USER EQUIPMENT AND BASE STATION FOR TRANSMITTING UPLINK SIGNALS

CROSS-REFERENCE TO RELATED APPLICATIONS

The present application is a continuation of U.S. patent application Ser. No. 16/518,749 filed on Jul. 22, 2019, which is a continuation of U.S. patent application Ser. No. 15/547,795 filed on Jul. 31, 2017 now U.S. Pat. No. 10,362,545 issued on Jul. 23, 2019, which is a 371 of International Patent Application No. PCT/KR2016/000944 filed on Jan. 28, 2016, which claims priority to Chinese Patent Application No. 201510047497.7 filed on Jan. 29, 2015, the disclosures of which are herein incorporated by reference in their entirety.

BACKGROUND

1. Field

The present disclosure relates to mobile communication technologies, and more particularly, to a method, a user equipment (UE) and a base station (evolved node B; ENB) for transmitting uplink signals.

2. Description of Related Art

Accompanying with increasing sharp contradiction between outbreak of users' demands for high-bandwidth wireless services and scarce spectrum resources, mobile operators start to consider taking unlicensed frequency bands as a supplement for licensed frequency bands. Thus, research about deploying long term evolution (LTE) on unlicensed frequency bands has been scheduled. Third generation partnership project (3GPP) starts to research and pass effective carrier aggregation of unlicensed frequency bands and licensed frequency bands. As shown in FIG. 1(a) and FIG. 1(b), when guaranteeing that no obvious effect is generated for other technologies of unlicensed frequency bands, how to effectively improve utilization of entire network's spectrum is an urgent technical problem to be solved.

Unlicensed frequency bands have generally been allocated for other applications, e.g., wireless fidelity (WiFi) of radar or 802.11 series. Thus, interference level on unlicensed frequency bands is uncertain. Subsequently, it is generally difficulty to guarantee quality of service (QoS) of LTE transmission. However, the unlicensed frequency bands may still be applied for data transmission with lower QoS requirements. Here, an LTE system deployed on the unlicensed frequency bands may be referred to as an LTE-unlicensed (LTE-U) system. How to avoid mutual interference between the LTE-U system and other wireless systems, such as radar, or WiFi, on the unlicensed frequency bands is a key problem.

Clear channel assessment (CCA), which is a mechanism to avoid collision, is generally employed by the unlicensed frequency bands. Before transmitting a signal, a station (STA) must detect a wireless channel. When detecting that the wireless channel is idle, the STA may occupy the wireless channel and transmit the signal. The LTE-U system also needs to comply with a similar mechanism, so as to ensure a small interference to other signals. A simpler method is as follows. An LTE-U device (base station or terminal user) may be dynamically opened or closed, based on a CCA result. That is, when detecting that a channel is idle, the LTE-U device may transmit a signal. When detecting that a channel is busy, the LTE-U device may not transmit a signal.

In the current LTE system, random access process may be executed by a primary cell (Pcell) or a secondary cell (Scell).

The objective for executing the random access process by the Pcell may be as follows. Establish an initial connection for a UE in a radio resource control_idle (RRC_IDLE) state. Re-establish an RRC connection for a UE. Switch a cell. A downlink service arrives, or an uplink service arrives, when a UE in the RRC connected state is out-of-step in an uplink direction. Locate a UE in the RRC connected state.

The random access process may be executed by the Scell, so as to establish uplink synchronization on a corresponding secondary timing advance group (sTAG).

The random access process for implementing foregoing uplink synchronization may include three blocks as follows.

A first block: a base station may allocate a random access preamble by using downlink signaling.

The base station may allocate a non-competitive random access preamble for a user.

The downlink signaling may be borne by a physical downlink control channel (PDCCH) order or other high-layer signaling.

The PDCCH order may include a preamble index and a mask index of a physical random access channel (PRACH) channel.

A second block: a user may transmit the random access preamble on the PRACH channel.

The random access preamble may be transmitted by the user, based on code word sequence and time-frequency resources indicated by the signaling received in the first block.

In the first PRACH resource subframe when 6 ms is passed after receiving the PDCCH order, the UE may transmit the random access preamble on an uplink carrier scheduled by the PDCCH order through a PRACH channel. That is, suppose the PDCCH order is received in subframe n, PRACH may be transmitted in the first PRACH resource subframe after subframe n+k (k>=6).

A third block: the base station may transmit a random access response born by a physical downlink shared channel (PDSCH).

The UE may receive the random access response within a random access response window. When no random access response is received, the UE may make preparations for re-transmitting the PRACH within 4 ms after the end of the random access response window.

In the current LTE system, various timing advance groups (TAGs) may be configured for a UE. Each TAG may include at least one carrier. Based on the foregoing blocks, a base station may establish uplink synchronization for each TAG. When all the carries within a TAG belong to unlicensed frequency bands, a UE needs to perform the CCA detection to a carrier triggered by the PDCCH order. The UE may transmit the PRACH, only when the carrier is idle. Because of different geographic locations of base station and UE, and difference between scheduling time and actual transmitting time, an uplink carrier channel, the PRACH transmission of which is triggered by the base station, probably be occupied, and then the UE may not execute uplink transmission. Subsequently, uplink synchronization delay may be increased.

It should be noted that, the foregoing descriptions about technical background are put forward, so as to provide a clear and complete description for technical solutions of the present disclosure, and to facilitate understandings of persons having ordinary skill in the art. It is not appropriate to consider that the foregoing technical solutions are well known to persons having ordinary skill in the art, only because the foregoing technical solutions are described in background section of the present disclosure.

SUMMARY

The present disclosure provides a method, a UE and a base station for transmitting uplink random access signals, which may shorten delay for establishing uplink synchronization, so as to improve efficiency of the whole network.

The present disclosure provides a method for transmitting an uplink signal, including:

receiving uplink synchronization command information, which at least includes resource allocation information of uplink signals of an uplink carrier; and, transmitting the uplink signal in a first idle uplink signal resource subframe, which is within an uplink signal transmission window of the uplink carrier, based on the resource allocation information.

Preferably, the method further includes:

determining whether an uplink signal resource subframe is idle, by performing a clear channel assessment (CCA) detection to the uplink signal resource subframe.

Preferably, a starting point of the uplink signal transmission window is a subframe where the uplink synchronization command information is received, or, a first uplink signal resource subframe after subframe (n+k), the uplink synchronization command information is received in subframe n, and k is greater than or equal to a set constant;

wherein length of the uplink signal transmission window is configured by a base station, or is predefined;

when being configured by the base station, the length of the uplink signal transmission window is semi-statically configured by high-layer signaling, or is configured in the uplink synchronization command information.

Preferably, the method further includes:

under the circumstances that second uplink synchronization command information is received in subframe j, and subframe j is located in a first uplink signal transmission window, when the uplink signal is not transmitted within the first uplink signal transmission window;

for subframes located before subframe (j+k) within the first uplink signal transmission window, performing a CCA detection to a corresponding uplink signal resource subframe, based on indications of the uplink synchronization command information, and transmitting the uplink signal when there is an idle uplink signal resource subframe;

starting from the first uplink signal resource subframe after subframe (j+k), performing the CCA detection to a corresponding uplink signal resource subframe, based on indications of the second uplink synchronization command information, and transmitting the uplink signal when there is an idle uplink signal resource subframe; or, stopping the CCA detection within the first uplink signal transmission window, starting from the first uplink signal resource subframe after subframe (j+k), performing the CCA detection to a corresponding uplink signal resource subframe, based on the second uplink synchronization command information, and transmitting the uplink signal when there is an idle uplink signal resource subframe.

The present disclosure also provides a user equipment (UE), including a first receiving module and a first uplink signal transmitting module, wherein the first receiving module is to receive uplink synchronization command information, which at least includes resource allocation information of uplink signals of an uplink carrier; and, the first uplink signal transmitting module is to transmit an uplink signal in a first idle uplink signal resource subframe, which is within an uplink signal transmission window of the uplink carrier, based on the resource allocation information.

The present disclosure also provides a base station, including a first command transmitting module and a first signal receiving module;

wherein the first command transmitting module is to transmit uplink synchronization command information, which at least includes resource allocation information of uplink signals of an uplink carrier; and, the first signal receiving module is to receive an uplink signal in each uplink signal resource subframe, which is within an uplink signal transmission window of the uplink carrier scheduled, and stopping continuously receiving the uplink signal from the uplink signal transmission window, after correctly receiving the uplink signal.

The present disclosure also provides a method for transmitting an uplink signal, including:

receiving uplink synchronization command information, which at least includes resource allocation information of uplink signals of N uplink carriers about a timing advance group (TAG), wherein N is greater than or equal to 1;

selecting one or N1 uplink carriers from the TAG, based on the resource allocation information;

determining whether to transmit the uplink signal, by determining whether a first uplink signal resource subframe after subframe (n+k) of the one or N1 uplink carriers is idle, wherein N1 is greater than or equal to 2, the uplink synchronization command information is received in subframe n, and k is greater than or equal to a set constant.

Preferably, indication mode of the resource allocation information includes:

when there is a group of uplink signal resource indication bits in the uplink synchronization command information, indicating, by the group of uplink signal resource indication bits, uplink signal resource allocation of N uplink carriers, by using a predetermined mode;

when there are N groups of uplink signal resource indication bits in the uplink synchronization command information, respectively indicating, by the N groups of uplink signal resource indication bits, the uplink signal resource allocation of the N uplink carriers.

Preferably, indicating by the group of uplink signal resource indication bits the uplink signal resource allocation of N uplink carriers, by using the predetermined mode includes:

determining the uplink signal resources of the uplink carrier, which is scheduled by the uplink synchronization command information, based on a resource index indicated by the uplink signal resource indication bits;

deriving the uplink signal resources of the other uplink carriers from the resource index of the uplink carrier, based on a signaling-configured or a predefined mapping rule; or, wherein the uplink signal resources indicated by the uplink signal resource indication bits belong to an uplink carrier, which possesses the smallest cell index within the TAG; the uplink signal resources of the other uplink carriers are derived from the resource index of the uplink carrier, based on the signaling-configured or predefined mapping rule.

Preferably, the method further includes:

performing a CCA detection to the first uplink signal resource subframe, to determine whether the first uplink signal resource subframe is idle.

Preferably, when selecting to transmit the uplink signal on an uplink carrier, determining whether to transmit the uplink signal, by determining whether the first uplink signal resource subframe after subframe (n+k) of the one or N1 uplink carriers is idle, includes:

when all the uplink carriers of the TAG belong to unlicensed frequency bands, performing the CCA detection to some uplink carriers, or all the uplink carriers of the TAG;

under the circumstances that an uplink signal resource subframe set of an uplink carrier, to which the CCA detection is performed, is the same, selecting an uplink carrier from at least one uplink carrier to transmit the uplink signal, when the first uplink signal resource subframe after subframe (n+k) of the at least one uplink carrier is idle;

when the first uplink signal resource subframe after subframe (n+k) of each uplink carrier is busy, not transmitting the uplink signal; or, selecting an uplink carrier with the lowest interference to transmit the uplink signal;

when the uplink signal resource subframe set of each uplink carrier, to which the CCA detection is performed, is different, selecting an uplink carrier, transmission time of the first uplink signal resource subframe of which is the earliest, from all the uplink carriers with the idle first uplink signal resource subframe, to transmit the uplink signal, or, when all the uplink carriers of the TAG belong to the unlicensed frequency bands, performing the CCA detection to some uplink carriers, or all the uplink carriers within the TAG, and selecting an uplink carrier, the first uplink signal resource subframe after subframe (n+k) of which is idle, to transmit the uplink signal, based on a predefined priority.

Preferably, when selecting to transmit the uplink signal on at least two uplink carriers, determining whether to transmit the uplink signal, by determining whether the first uplink signal resource subframe after subframe (n+k) of the one or N1 uplink carriers is idle, includes:

when all the uplink carriers of the TAG belong to unlicensed frequency bands, performing the CCA detection to all the uplink carriers in the TAG, respectively determining whether the first uplink signal resource subframe after subframe (n+k) of each uplink carrier is idle, and respectively transmitting the uplink signal on a corresponding uplink carrier, when the first uplink signal resource subframe after subframe (n+k) of the corresponding uplink carrier is idle; or, when all the uplink carriers of the TAG belong to the unlicensed frequency bands, performing, by the UE, the CCA detection to an uplink carrier configured within the TAG, and transmitting the uplink signal on the uplink carrier, the first uplink signal resource subframe after subframe (n+k) of which is idle, based on configuration information.

Preferably, the method further includes:

under the circumstances that second uplink synchronization command information is received in subframe j, before transmitting the uplink signal, when the first uplink signal resource subframe after subframe (n+k) of at least one uplink carrier is located after subframe j, for subframes located before subframe (j+k), performing the CCA detection to a corresponding uplink signal resource subframe, based on resources indicated by the uplink synchronization command information, and transmitting the uplink signal when the uplink signal resource subframe is idle;

starting from subframe (j+k), performing the CCA detection to a corresponding uplink signal resource subframe, based on indications of the second uplink synchronization command information, and transmitting the uplink signal when the uplink signal resource subframe is idle; or, stopping the CCA detection based on the uplink synchronization command information, starting from the first uplink signal resource subframe after subframe (j+k), performing the CCA detection to a corresponding uplink signal resource subframe, based on the second uplink synchronization command information, and transmitting the uplink signal when the uplink signal resource subframe is idle.

The present disclosure also provides a UE, including a second receiving module and a second uplink signal transmitting module, wherein the second receiving module is to receive uplink synchronization command information, which at least includes resource allocation information of uplink signals of N uplink carriers about a TAG, wherein N is greater than or equal to 1; and, the second uplink signal transmitting module is to select one or N1 uplink carriers from the TAG, based on the resource allocation information, and determine whether to transmit an uplink signal, by determining whether a first uplink signal resource subframe after subframe (n+k) of the one or N1 uplink carriers is idle, wherein N1 is greater than or equal to 2, the uplink synchronization command information is received in subframe n, and k is greater than or equal to a set constant.

The present disclosure also provides a base station, including a second command transmitting module and a second signal receiving module, wherein the second command transmitting module is to transmit uplink synchronization command information, which at least includes resource allocation information of uplink signals of N uplink carriers about a TAG, wherein N is greater than or equal to 1; and, the second signal receiving module is to receive an uplink signal of a corresponding uplink carrier in an uplink signal resource subframe, which is respectively determined by all the uplink carriers or configured uplink carriers of the TAG;

when allowing a UE to transmit an uplink signal on one uplink carrier, the second signal receiving module is further to stop receiving the uplink signal from the other uplink carriers, after correctly receiving the uplink signal of one uplink carrier;

when allowing the UE to transmit an uplink signal on at least two uplink carriers, after correctly receiving the uplink signal on one uplink carrier, the second signal receiving module is further to stop receiving the uplink signal on the other uplink carriers, or continuously receive the uplink signal on the other uplink carriers.

The present disclosure also provides a method for transmitting an uplink signal, including:

receiving uplink synchronization command information, which at least includes resource allocation information of uplink signals of N uplink carriers about a TAG, wherein N is greater than or equal to 1;

selecting one or N1 uplink carriers from the TAG, based on the resource allocation information, and transmitting the uplink signal in a first idle uplink signal resource subframe, which is within an uplink signal transmission window of the one or N1 uplink carriers, wherein N1 is greater than or equal to 2.

Preferably, indication mode of the resource allocation information includes:

when there is a group of uplink signal resource indication bits in the uplink synchronization command information, indicating, by the group of uplink signal resource indication bits, uplink signal resource allocation of the N uplink carriers, based on a predefined mode;

when there are N groups of uplink signal resource indication bits in the uplink synchronization command information, respectively indicating, by the N groups of uplink signal resource indication bits, the uplink signal resource allocation of the N uplink carriers.

Preferably, indicating by the group of uplink signal resource indication bits the uplink signal resource allocation of the N uplink carriers, based on the predefined mode includes:

determining uplink signal resources of the uplink carrier scheduled by the uplink synchronization command information, based on a resource index indicated by the uplink signal resource indication bits;

deriving the uplink signal resources of the other uplink carriers from the resource index of the uplink carrier, based on a signaling-configured or predefined mapping rule; or, wherein the uplink signal resources indicated by the uplink signal resource indication bits belong to an uplink carrier, which possesses the smallest cell index of the TAG, the uplink signal resources of the other uplink carriers are derived from the resource index of the uplink carrier, based on the signaling-configured or predefined mapping rule.

Preferably, the method further includes:

determining whether an uplink signal resource subframe is idle, by performing the CCA detection to the uplink signal resource subframe.

Preferably, a starting point of the uplink signal transmission window is a subframe where the uplink synchronization command information is received, or, a first uplink signal resource subframe after subframe (n+k), wherein the uplink synchronization command information is received in subframe n, and k is greater than or equal to a set constant;

wherein length of the uplink signal transmission window is configured by a base station or is predefined, when being configured by the base station, the length of the uplink signal transmission window is semi-statically configured by high-layer signaling or by the uplink synchronization command information.

Preferably, the uplink signal transmission window of each uplink carrier is configured independently, or the uplink signal transmission window of each uplink carrier of a UE is the same.

Preferably, when selecting to transmit the uplink signal on one uplink carrier, transmitting the uplink signal in the first idle uplink signal resource subframe, which is within the uplink signal transmission window of the one or N1 uplink carriers, includes:

when all the uplink carriers of the TAG belong to unlicensed frequency bands, respectively performing the CCA detection to a corresponding uplink signal transmission window of each uplink carrier of the TAG;

when an uplink signal resource subframe set of an uplink carrier, to which the CCA detection is performed, is the same, selecting an uplink carrier from uplink carriers with a same idle uplink signal resource subframe, to transmit the uplink signal;

when the uplink signal resource subframe set of each uplink carrier, to which the CCA detection is performed, is different, selecting an uplink signal resource subframe, which possesses the earliest transmission time, from idle first uplink signal resource subframes of all the uplink carriers, to transmit the uplink signal; or, when all the uplink carriers of the TAG belong to the unlicensed frequency bands, respectively performing the CCA detection to all the uplink carriers of the TAG within a corresponding uplink signal transmission window, and selecting an idle uplink carrier to transmit the uplink signal based on a predetermined priority.

Preferably, when selecting to transmit the uplink signal on at least two uplink carriers, transmitting the uplink signal in the first idle uplink signal resource subframe, which is within the uplink signal transmission window of the one or N1 uplink carriers, includes:

when all the uplink carriers of the TAG belong to unlicensed frequency bands, respectively performing the CCA detection to all the uplink carriers of the TAG within a corresponding uplink signal transmission window, and respectively transmitting the uplink signal on each idle uplink carrier; or, when all the uplink carriers of the TAG belong to the unlicensed frequency bands, respectively performing the CCA detection to each configured uplink carrier of the TAG within a corresponding uplink signal transmission window, and transmitting the uplink signal on an idle uplink carrier based on configuration information.

Preferably, the method further includes:

under the circumstances that second uplink synchronization command information is received in subframe j, before transmitting the uplink signal, and the first uplink signal resource subframe after subframe (n+k) of at least one uplink carrier is located after subframe j, for subframes located before subframe (j+k) within a first uplink signal transmission window, performing the CCA detection to a corresponding uplink signal resource subframe, based on indications of the uplink synchronization command information, and transmitting the uplink signal when there is an idle uplink signal resource subframe;

starting from the first uplink signal resource subframe after subframe (j+k), performing the CCA detection to a corresponding uplink signal resource subframe, based on indications of the second uplink synchronization command information, and transmitting the uplink signal when there is an idle uplink signal resource subframe; or, stopping the CCA detection performed within the first uplink signal transmission window, starting from the first uplink signal resource subframe after subframe (j+k), performing the CCA detection to a corresponding uplink resource subframe, based on the second uplink synchronization command information, and transmitting the uplink signal when there is an idle uplink signal resource subframe.

The present disclosure also provides a UE, including a third receiving module and a third uplink signal transmitting module, wherein the third receiving module is to receive uplink synchronization command information, which at least includes resource allocation information of uplink signals of N uplink carriers about a TAG, wherein N is greater than or equal to 1; and, the third uplink signal transmitting module is to select one or N1 uplink carriers from the TAG, based on the resource allocation information, and transmitting the uplink signal in a first idle uplink signal resource subframe, which is within an uplink signal transmission window of the one or N1 uplink carriers, wherein N1 is greater than or equal to 2.

The present disclosure also provides a base station, including a third command transmitting module and a third signal receiving module, wherein the third command transmitting module is to transmit uplink synchronization command information, which at least includes resource allocation information of uplink signals of N uplink carriers about a TAG, wherein N is greater than or equal to 1; and, the third signal receiving module is to receive an uplink signal of a corresponding uplink carrier in an uplink signal resource subframe, which is within a respective uplink signal transmission window of all the uplink carriers, or configured uplink carriers of the TAG;

when allowing a UE to transmit an uplink signal on one uplink carrier, after correctly receiving the uplink signal of one uplink carrier, the third signal receiving module is further to stop receiving the uplink signal of the other uplink carriers;

when allowing the UE to transmit the uplink signal on at least two uplink carriers, after correctly receiving the uplink signal of one uplink carrier, the third signal receiving module is further to stop receiving the uplink signal on the other uplink carriers, or continuously receiving the uplink signal on the other uplink carriers.

DETAILED DESCRIPTION

To solve problems in the prior art, the present disclosure provides several methods, UEs and base stations for transmitting uplink signals. In the present disclosure, an UE may include a communication unit (transceiver) and a control unit (controller). The communication unit may communicate with a different network node (ENB or UE). The control unit controls overall states and operations of the components of the UE. This is for ease of description only. That is, the above apparatus may have a different configuration. For example, the UE may further include an input unit and a storage unit. The base station (ENB) also may include a communication unit (transceiver) and a control unit (controller). In the present disclosure, the uplink signal refers to a signal used for establishing uplink synchronization, which may be applied in the following scenes, e.g., uplink out-of-step of a UE in the RRC connected state, while a downlink service or uplink service arrives, and establish uplink synchronization on a corresponding sTAG. In the present disclosure, process for establishing uplink synchronization will be described, by taking a basic flow of current random access as an example, which may include corresponding downlink signaling, a corresponding random access preamble, and a random access response. In three embodiments of the present disclosure, PRACH is taken as an example for the random access signal. The downlink signaling may indicate the preamble index of PRACH and PRACH mask index. However, the present disclosure is similarly applicable to other mechanisms for establishing uplink synchronization, and subsequently is also applicable to corresponding downlink signaling for allocating resources and a signal for establishing uplink synchronization. For example, the uplink synchronization signal may be a sounding reference signal (SRS). Subsequently, resource indication of downlink signaling may include an SRS index and an SRS comb, or an SRS resource index. SRS resource may be preconfigured by UE-specific high-layer signaling or broadcast signaling.

A First Embodiment

Figure 1A:
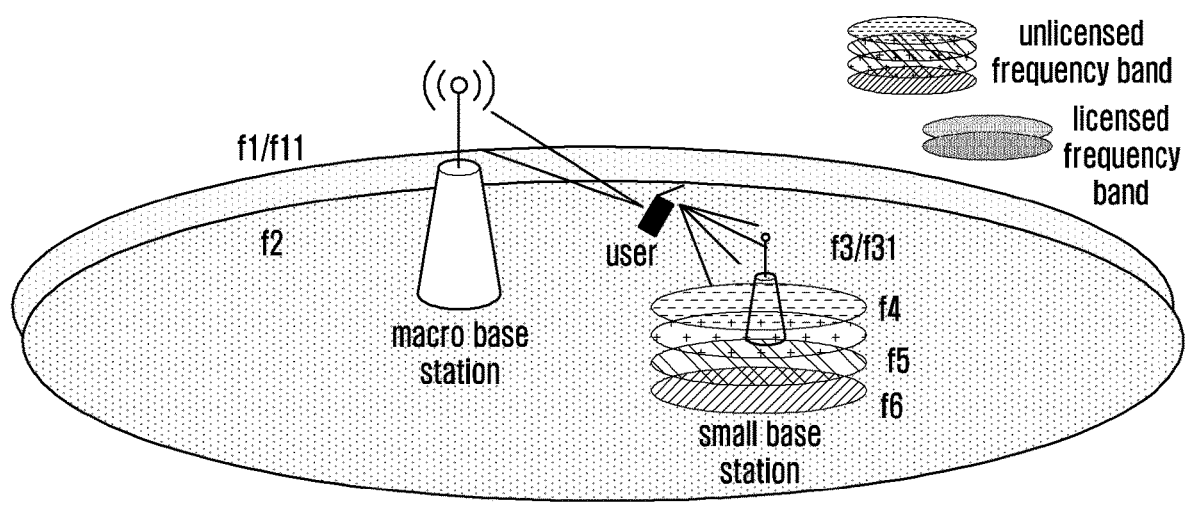
FIG. 1(a) is a schematic diagram illustrating a first mutual networking scene of licensed frequency bands and unlicensed frequency bands.
Figure 1B:
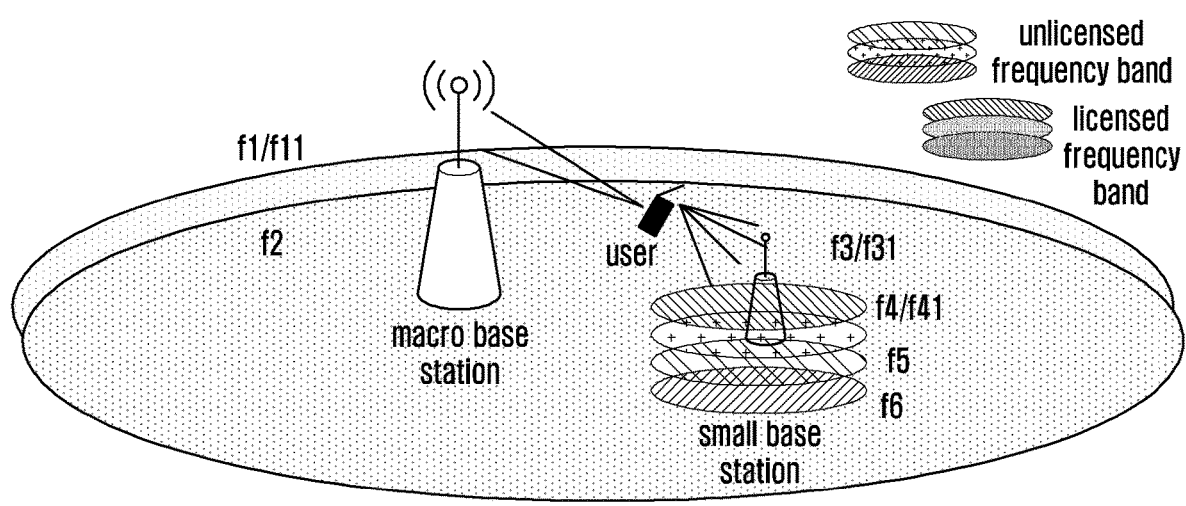
FIG. 1(b) is a schematic diagram illustrating a second mutual networking scene of licensed frequency bands and unlicensed frequency bands.
Figure 2:
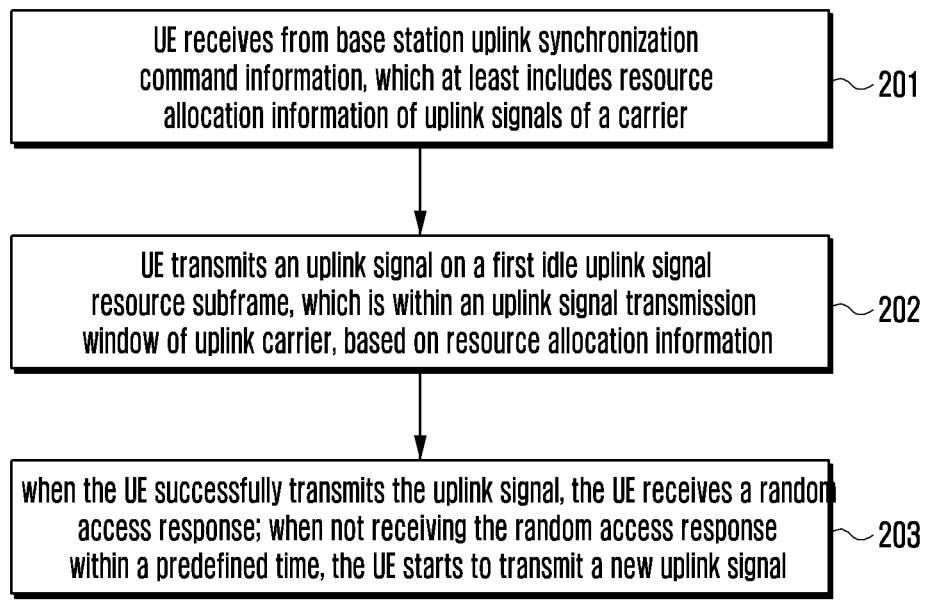
FIG. 2 is a flowchart illustrating a method for transmitting an uplink random access signal, in accordance with a first embodiment of the present disclosure.

FIG. 2 is a flowchart illustrating a method for transmitting an uplink random access signal, in accordance with a first embodiment of the present disclosure. The method may include the following blocks.

In block 201: a UE receives from a base station uplink synchronization command information, which at least includes resource allocation information of uplink signals of an uplink carrier.

As mentioned above, the uplink signal in the present disclosure refers to a signal used for establishing uplink synchronization. In subsequent descriptions of the present disclosure, the random access signal is taken as an example for descriptions. And then, the uplink synchronization command information in the embodiment may be random access command information. The random access command information may be borne by a PDCCH order, and then be transmitted to a UE.

When executing cross-carrier scheduling, carrier indicator field (CIF) of the PDCCH order may indicate an uplink carrier, which is expected to transmit the PRACH. That is, uplink carrier i corresponding to CIF=i of the PDCCH order is the uplink carrier, which is expected to transmit the PRACH. When executing self-scheduling, the base station may allocate uplink carrier and downlink carrier in pairs for UE. When detecting the PDCCH order on downlink carrier i, uplink carrier i corresponding to downlink carrier i may be the uplink carrier, which is expected to transmit the PRACH.

Resource allocation information of uplink signal at least includes preamble index of PRACH and PRACH mask index.

In block 202, the UE may transmit an uplink signal in a first idle uplink signal resource subframe, which is within an uplink signal transmission window of the uplink carrier, based on the resource allocation information.

In the embodiments of the present disclosure, descriptions are put forward by taking the PRACH signal as an example. Corresponding relationship of each term may be as follows.

The "uplink signal transmission window" corresponds to "PRACH transmission window" in the embodiment.

The "uplink signal resource subframe" corresponds to "PRACH resource subframe" in the embodiment.

The "uplink signal" corresponds to "PRACH" in the embodiment.

Based on the foregoing corresponding relationship, actual process of the block may be as follows. The UE may transmit the PRACH in the first idle PRACH resource subframe, which is within the PRACH transmission window on uplink carrier i scheduled by the PDCCH order.

PRACH resource may refer to time-frequency resources, which may transmit the PRACH, e.g., subframe and physical resource block. The PRACH resource may be configured by high-layer signaling. A PRACH resource subframe set may include subframes used for transmitting the PRACH, which may be referred to as PRACH resource subframe.

In the block, a first idle subframe meeting a condition may be detected within the PRACH resource subframe set, and the condition may be as follows. There are at least k subframes between the idle subframe and a subframe where the PDCCH order is received. K is greater than or equal to a set constant. Thus, a PRACH transmission window may be set. And the PRACH may be transmitted in the first idle PRACH resource subframe within the PRACH transmission window.

The PRACH transmission window may be configured by the base station, or may be predefined. When the PRACH transmission window is configured by the base station, window length is configurable or predefined. When the PRACH transmission window is predefined, the window length may also be predefined.

Starting point of the PRACH transmission window is the subframe where the PDCCH order is received. Alternatively, the starting point of the PRACH transmission window is the first PRACH resource subframe after subframe (n+k). The PDCCH order is received in subframe n. K is greater than or equal to a set constant. For example, based on current random access process, k>=6, which is taken as an example in the following descriptions.

Descriptions will be provided in the following accompanying with several examples.

Figure 3:
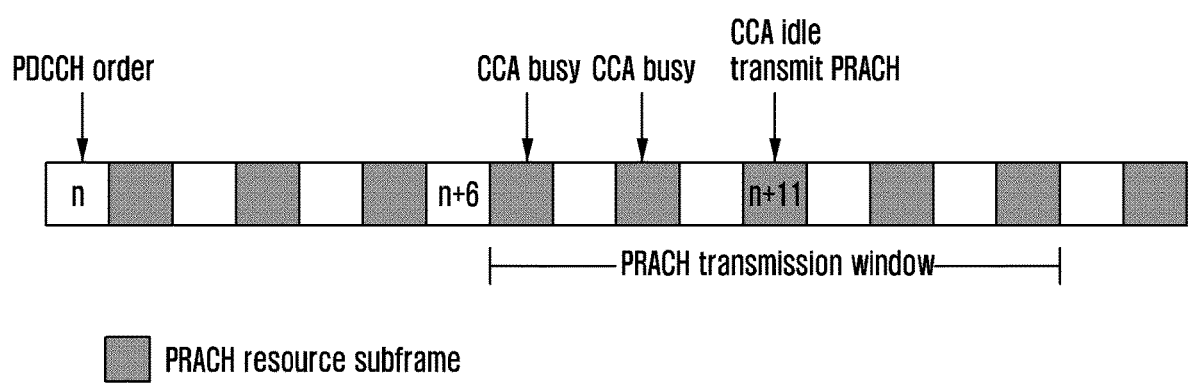
FIG. 3 is a schematic diagram illustrating to transmit PRACH within a PRACH window, in accordance with an example of the first embodiment of the present disclosure.

With reference to FIG. 3, the starting point of the PRACH transmission window in the example is subframe (n+7). The UE may execute the CCA detection within the PRACH transmission window. The PRACH may be transmitted, when a first PRACH resource subframe after subframe (n+7) is idle. That is, the PRACH may be transmitted in subframe (n+11) as illustrated in FIG. 3.

Figure 4:
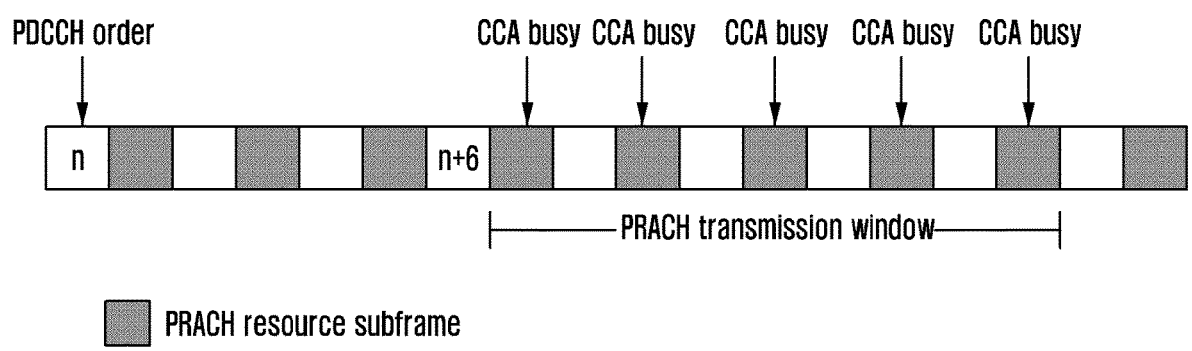
FIG. 4 is a schematic diagram illustrating a scene where the PRACH is not transmitted, in accordance with an example of the first embodiment of the present disclosure.

With reference to FIG. 4, the starting point of the PRACH transmission window in the example is subframe (n+7). The UE may execute the CCA detection within the PRACH transmission window. The PRACH transmission may be given up, when idle carrier is not detected in the PRACH resource subframes until the PRACH transmission window ends. The physical layer of the UE needs to report to the high level of the UE that the PRACH is not transmitted.

Within a PRACH transmission window (refer to a first PRACH transmission window in the following), a new PDCCH order is received, before a UE transmits the PRACH. That is, suppose a new PDCCH order is received in subframe j, which is within the first PRACH transmission window, and the UE does not transmit the PRACH within the first PRACH transmission window, the PRACH may be transmitted with two modes in the following.

A first mode may be as follows. Among subframes located before subframe (j+6) within the first PRACH transmission window, the UE may still perform the CCA detection to a corresponding subframe, based on resources indicated by a previous PDCCH order, and transmit the PRACH when the corresponding subframe is idle. Starting from the first PRACH resource subframe after subframe (j+6), based on resources indicated by the PDCCH order received in subframe j, the UE may execute the CCA detection within a new PRACH transmission window (refer to a second PRACH transmission window in the following), and try to transmit the PRACH.

Figure 5:
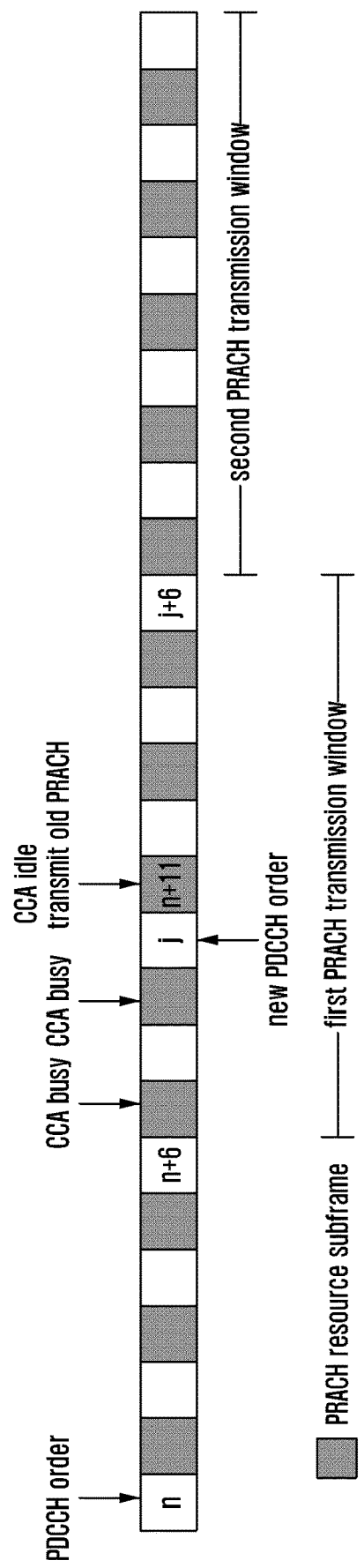
FIG. 5 is a schematic diagram illustrating a first processing mode in a first scene, where a new PDCCH order is received within a PRACH transmission window, before transmitting the PRACH in the PRACH transmission window, in accordance with an example of the first embodiment of the present disclosure.

As shown in the first scene of FIG. 5, the CCA detection may be performed to subframes located before subframe (j+6), based on the PDCCH order corresponding to the first PRACH transmission window. Idle subframe (n+11) is detected. Thus, the PRACH is transmitted in subframe (n+11).

Figure 6:
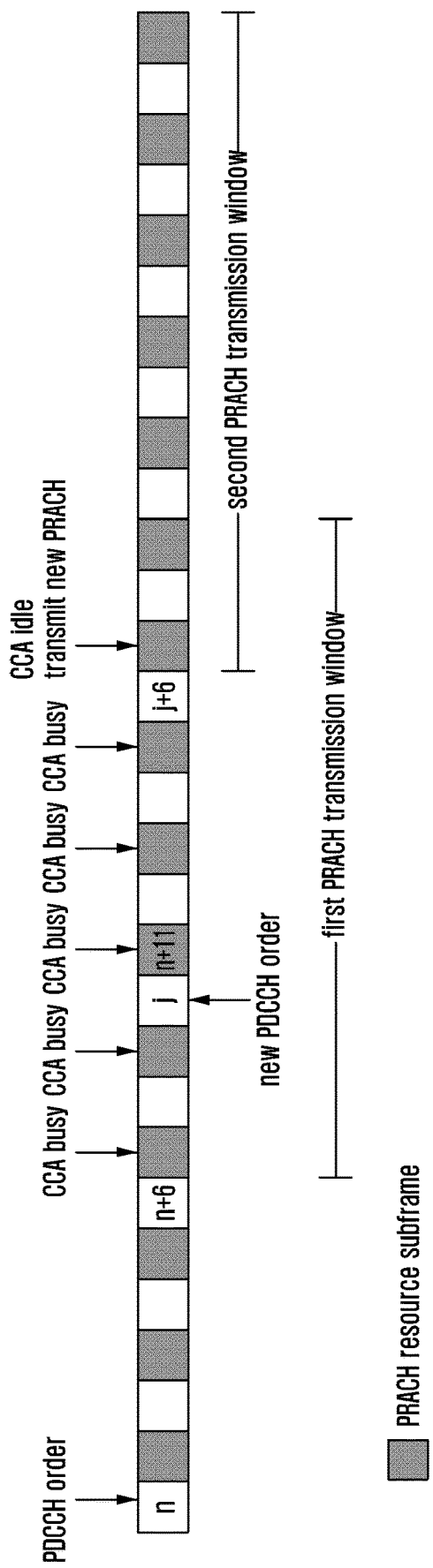
FIG. 6 is a schematic diagram illustrating the first processing mode in a second scene, where a new PDCCH order is received within a PRACH transmission window, before transmitting the PRACH in the PRACH transmission window, in accordance with an example of the first embodiment of the present disclosure.
Figure 7:
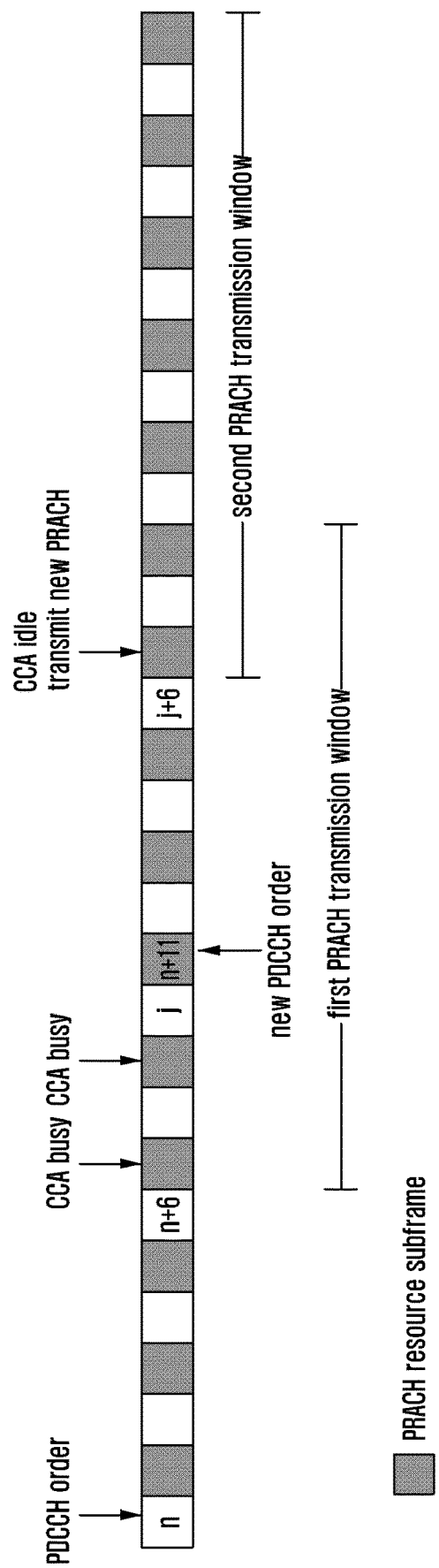
FIG. 7 is a schematic diagram illustrating a second processing mode in a scene, where a new PDCCH order is received within a PRACH transmission window, before transmitting the PRACH in the PRACH transmission window, in accordance with an example of the first embodiment of the present disclosure.

As shown in the second scene of FIG. 6, the CCA detection may be performed to subframes located before subframe (j+6), based on the PDCCH order corresponding to the first PRACH transmission window, and no idle subframe is detected. Starting from the first PRACH resource subframe (that is, subframe (j+7) in FIG. 6) after subframe (j+6), the CCA detection may be executed based on a new PDCCH order received in subframe j. Idle subframe (j+7) is detected. Thus, the PRACH is transmitted in subframe (j+7).

In the two scenes shown in FIG. 5 and FIG. 6, no matter where is the end point of the first PRACH transmission window, subframe (j+6) may be taken as the boundary in the foregoing processing mode, so as to determine the CCA detection may be performed to resources indicated by which PDCCH order.

A second method may be as follows. The UE no longer tries to transmit the PRACH indicated by last PDCCH order. Instead, starting from the first PRACH resource subframe after subframe (j+6), based on resources indicated by the PDCCH order received in subframe j, the CCA detection may be executed within a PRACH transmission window, by taking the first PRACH resource subframe after subframe (j+6) as the starting point. The PRACH may be transmitted in the first idle PRACH resource subframe detected within the PRACH transmission window.

In block 203, after successfully transmitting an uplink signal, the UE may receive a random access response. When no random access response is received within a predefined time, the UE may start to transmit a new uplink signal.

For example, when not receiving a response within a predefined random access response window, and being instructed by high level to re-transmit the PRACH, the UE may make preparations for transmitting the PRACH within k ms after the PRACH transmission window, e.g., k=4. The transmitted PRACH may be a new preamble, or a preamble indicated by a recent PDCCH order.

The UE may transmit the PRACH based on block 202. The starting point of the PRACH transmission window may be defined as an end point of the random access response window.

After making preparations for transmitting the PRACH, the UE may make a CCA assessment within a recent PRACH resource subframe. When the channel is idle, the UE may transmit the PRACH; otherwise, the UE may give up transmitting the PRACH.

In the embodiment, the base station may try to receive the PRACH in each PRACH subframe within the PRACH transmission window. Once the PRACH is received correctly, stop continuously trying to receive the PRACH within the PRACH transmission window. Within a PRACH transmission window, or at least a non-overlapped PRACH transmission window, one PRACH signal of a UE may be received at most.

In the embodiment, the base station may re-trigger transmission of the PRACH, based on a specific scheduling algorithm. For example, when the PRACH transmission window ends, and no PRACH signal coming from the UE is detected, the base station may re-transmit the PDCCH order. The base station may re-transmit the PDCCH order, when no PRACH signal coming from the UE is detected in the first PRACH resource subframe within the PRACH transmission window. The base station may trigger the same carrier, or may trigger different carriers to transmit the PRACH.

To avoid PRACH resource collision among different UEs, when allocating and scheduling the PRACH resources, the base station may avoid allocating the same PRACH resources for different users in subframes, which probably transmit the PRACH resources.

A Second Embodiment

Figure 8:
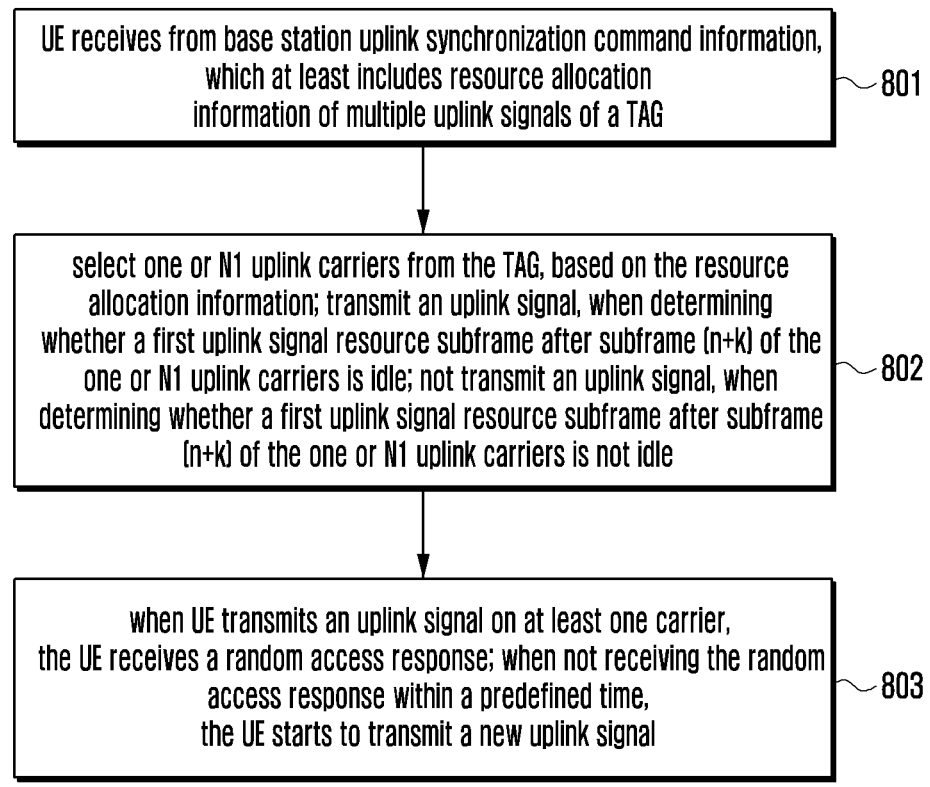
FIG. 8 is a flowchart illustrating a method for transmitting an uplink random access signal, in accordance with a second embodiment of the present disclosure.

FIG. 8 is a flowchart illustrating a method for transmitting an uplink signal, in accordance with a second embodiment of the present disclosure, which may include the following blocks.

In block 801, a UE may receive uplink synchronization command information from a base station. The uplink synchronization command information at least includes resource allocation information of uplink signals of multiple uplink carriers in one TAG.

In the embodiment, descriptions are still provided by taking random access signal as an example. The uplink synchronization command information may be random access command information, which may be borne by the PDCCH order to be transmitted to the UE. Suppose the UE detects the PDCCH order transmitted by the base station in subframe n, the PDCCH order may be borne by PDCCH or enhanced PDCCH (ePDCCH). The PDCCH order may employ cell-radio network temporary identifier (C-RNTI) or group-RNTI to execute a cyclic redundancy check (CRC) scrambling. The group-RNTI may be RNTI of one sTAG. The PDCCH order may be cross-carrier scheduled or self-scheduled PDCCH/ePDCCH.

The PDCCH order at least includes resource allocation information, which is used for establishing uplink synchronization signal of one TAG, e.g., preamble index of the PRACH and PRACH Mask index. Preferably, indication mode of resource allocation may be either one of the following two methods.

A first method may be as follows. In the PDCCH order, there is only one group of PRACH resource indication bits. The group of PRACH resource indication bits may indicate allocation of PRACH resources of multiple carriers, by using a predetermined mode. A signaling-configured or predefined mapping rule may be used, e.g., a predetermined resource index offset. Specifically, there are two implementation modes in the following.

a) The PRACH resources of uplink carrier i scheduled by the PDCCH order may be determined by the resource index, which is indicated by the PDCCH order. The PRACH resources of other carriers may be derived from the resource index of uplink carrier i, based on a signaling-configured or predefined mapping rule. Take a predefined resource index offset as an example, when executing a cross-carrier scheduling, the PRACH preamble index and PRACH mask index of uplink carrier i, which corresponds to CIF=i of the PDCCH order, are values indicated by the PDCCH order. However, another carrier may determine a corresponding resource index offset, based on a difference between index thereof and index of carrier i, so as to determine the PRACH resources of a corresponding carrier. When executing the self-scheduling, the PDCCH order may be detected on downlink carrier i. The PRACH preamble index and PRACH mask index of uplink carrier i may be values indicated by the PDCCH order. However, another carrier may determine a corresponding resource index offset, based on a difference between index thereof and index of carrier i, so as to determine the PRACH resources of a corresponding carrier.

b) The PRACH resources in the PDCCH order belong to an uplink carrier with the smallest cell index in the TAG. The PRACH resources of other carriers may be derived from resource index of the uplink carrier, based on a signaling-configured or predefined mapping rule. For example, another carrier may determine a corresponding resource index offset, based on a difference between index thereof and index of the carrier, so as to determine the PRACH resources of a corresponding carrier.

The carrier index in the method may be SCellIndex, or CIF, or other indexes, e.g., carrier sort index within the TAG, or configured sort index of multiple carriers, which may transmit the PRACH.

A second method may be as follows. In the PDCCH order, there are multiple groups of PRACH resource indication bits, which respectively indicate PRACH resource allocation of multiple carriers. The multiple groups of PRACH resource indication bits may be sorted based on a predetermined sequence. For example, the PRACH resource indication bits of the carrier may be sorted in sequence, based on indexes of carriers within a TAG or a pre-configured carrier sequence.

The PDCCH order is a group-specific instruction signaling, to which group RNTI scrambling may be performed, e.g., group ID/group RNTI of the TAG.

In block 802, select one or N1 uplink carriers from the TAG, based on the resource allocation information. Transmit an uplink signal, when determining that a first uplink signal resource subframe after subframe (n+k) of the one or N1 uplink carriers is idle. Not transmit an uplink signal, when determining that a first uplink signal resource subframe after subframe (n+k) of the one or N1 uplink carriers is not idle. N1 is greater than or equal to 2. The uplink synchronization command information is received in subframe n. K is greater than or equal to a set constant.

In the embodiment of the present disclosure, descriptions are provided by taking the PRACH signal as an example. Corresponding relationship of each term may be as follows.

The "uplink signal resource subframe" corresponds to "PRACH resource subframe" in the embodiment.

The "uplink signal" corresponds to the "PRACH" in the embodiment.

Based on the foregoing corresponding relationship, processes in the block are actually as follows. The UE may select at least one uplink carrier from the TAG, based on a predetermined criteria. When the first PRACH resource subframe after subframe (n+k) of the at least one uplink carrier is idle, transmit the PRACH in the first PRACH resource subframe; otherwise, not transmit the PRACH. K is greater than or equal to a set constant.

In the embodiment, descriptions are still provided by taking k>=6 as an example. When channel of a corresponding PRACH resource subframe of the at least one uplink carrier is busy, the UE may not transmit the PRACH on any carrier.

When selecting to transmit the PRACH on one uplink carrier, there may be two available implementation modes in the following.

A first mode may be as follows. When all the uplink carriers of the same TAG belong to unlicensed frequency bands, the UE may perform the CCA detection to some of or all of the uplink carriers of the TAG. When the first PRACH resource subframe after subframe (n+k) (k>=6) of uplink carrier x is idle, transmit the PRACH on uplink carrier x. The above-mentioned some of uplink subframes may be configured by base station, or may be determined based on a certain condition. When determining that the PRACH may be transmitted on one carrier, the UE may stop the CCA detection performed to the other carriers.

Figure 9:
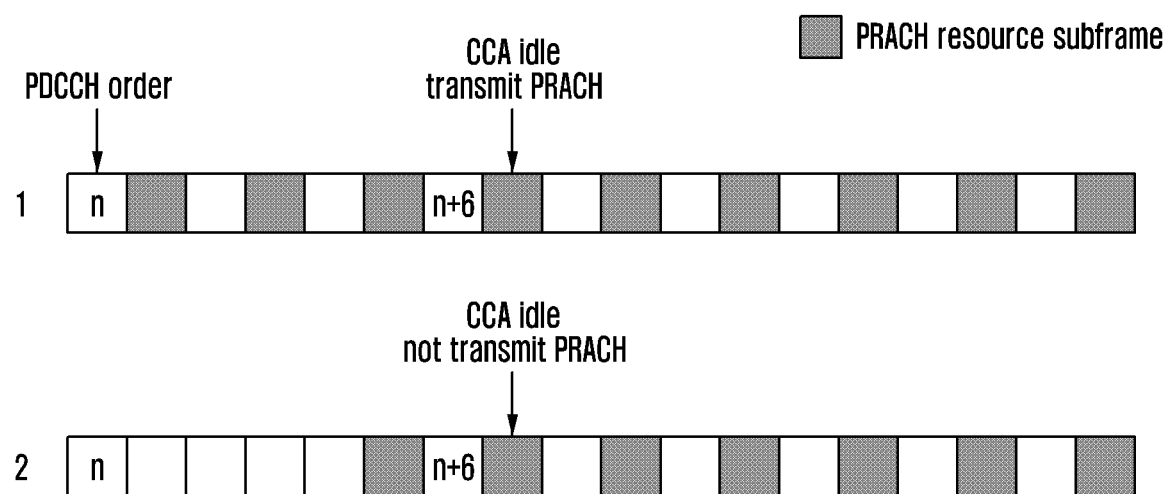
FIG. 9 is a schematic diagram illustrating that a UE selects an uplink carrier from idle uplink carriers of the same subframe to transmit PRACH, when PRACH resource subframe sets of multiple carriers are the same, in accordance with an example of the second embodiment of the present disclosure.

Under the circumstances that PRACH resource subframe sets of multiple carriers are the same (that is, the PRACH resource subframe sets of uplink carriers detected with CCA are the same), when the first PRACH resource subframe after subframe (n+k) (k>=6) of the at least one uplink carrier is idle, the UE may select one uplink carrier from uplink carriers (that is, the at least one uplink carrier), the respective PRACH resource subframe of which is idle, to transmit the PRACH. As shown in FIG. 9, when the first PRACH resource subframe after subframe (n+k) (k>=6) of each uplink carrier is busy, the UE may not transmit the PRACH. Alternatively, the UE may select an uplink carrier with the lowest interference to transmit the PRACH. The interference level may be obtained by the UE, after executing the CCA detection.

Figure 10:
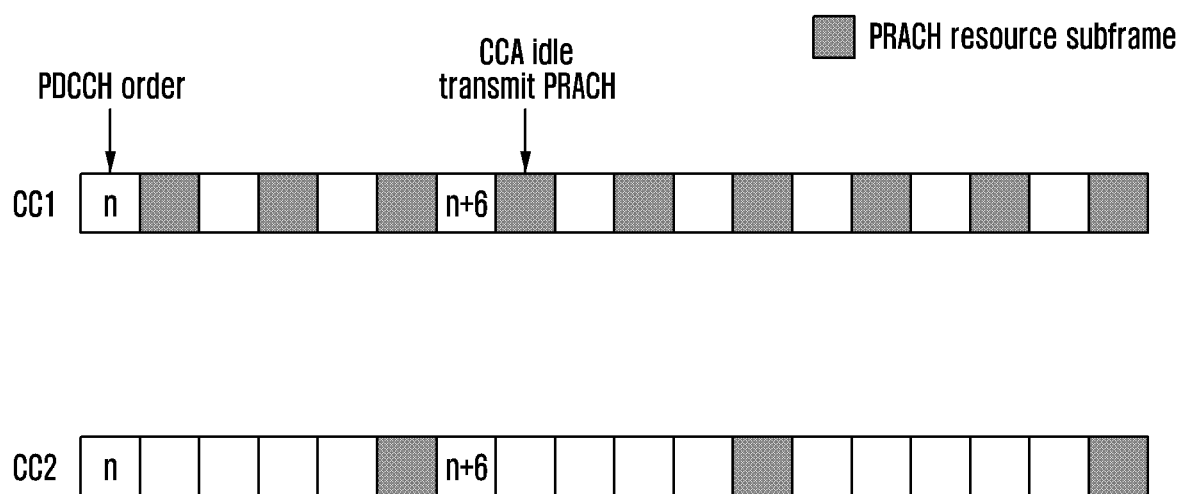
FIG. 10 is a schematic diagram illustrating that a UE selects a carrier with the earliest transmission time to transmit PRACH, when PRACH resource subframe sets of multiple carriers are different, in accordance with an example of the second embodiment of the present disclosure.

When the PRACH resource subframe sets of multiple carriers are different, the UE may select an uplink carrier with earliest transmission time of the first PRACH resource subframe, from all the uplink carriers with the idle first PRACH resource subframe, to transmit the PRACH. For example, as shown in FIG. 10, for carrier 1 (that is, CC1), subframe (n+7) is the first PRACH resource subframe after subframe (n+6). For carrier 2 (that is, CC2), subframe (n+11) is the first PRACH resource subframe after subframe (n+6). When subframe (n+7) of carrier 1 is idle, the UE may transmit the PRACH on carrier 1, instead of transmitting the PRACH on carrier 2.

Figure 11:
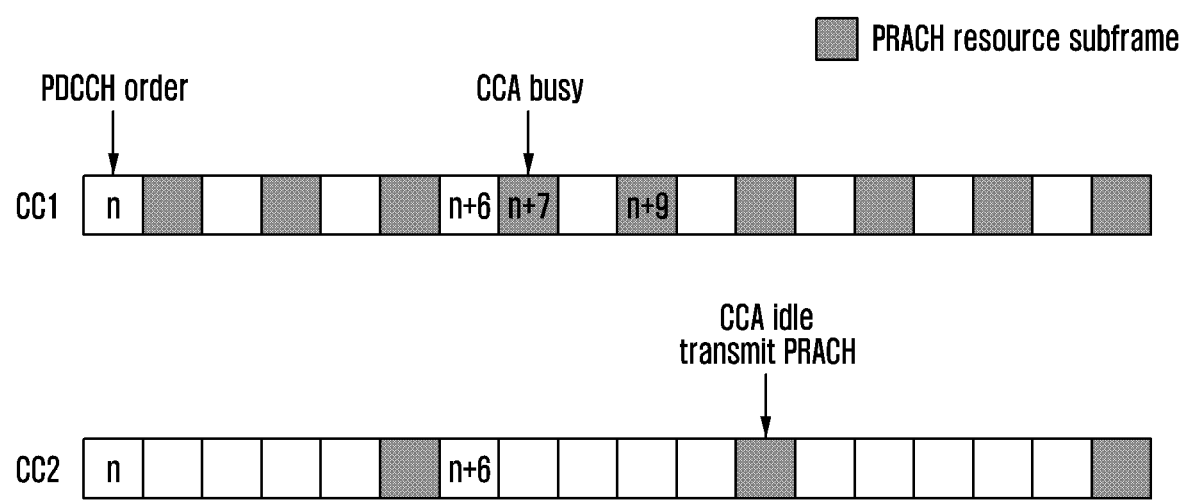
FIG. 11 is a schematic diagram illustrating that for an uplink carrier, a UE tries to transmit the PRACH in a first PRACH resource subframe after subframe (n+k), when uplink carrier of the first PRACH resource subframe after subframe (n+k) is busy, the UE gives up transmitting the PRACH on the uplink carrier, in accordance with an example of the second embodiment of the present disclosure.

In such mode, for an uplink carrier, the UE may try to transmit the PRACH in the first PRACH resource subframe after subframe (n+k). When the uplink carrier of the first PRACH resource subframe is busy, the UE may give up transmitting the PRACH on the uplink carrier. For example, regarding carrier 1 in FIG. 11, when carrier 1 is busy at time point (n+7), the UE may give up transmitting the PRACH, and no longer try to transmit the PRACH in other PRACH resource subframes.

A second mode may be as follows. When all the uplink carriers of the same TAG belong to unlicensed frequency bands, the UE may perform the CCA detection to all of or some of uplink carriers within the TAG, and select an uplink carrier, the first PRACH resource subframe after subframe (n+k) (k>=6) of which is idle, to transmit the PRACH, based on a predefined priority. The predefined priority may be determined based on a configured priority, or based on sequence of index number of each carrier. When determining that one carrier may be used to transmit the PRACH, the UE may stop the CCA detection performed to the other carriers.

When selecting to transmit the PRACH on multiple uplink carriers, there are two available implementation modes in the following.

Figure 12:
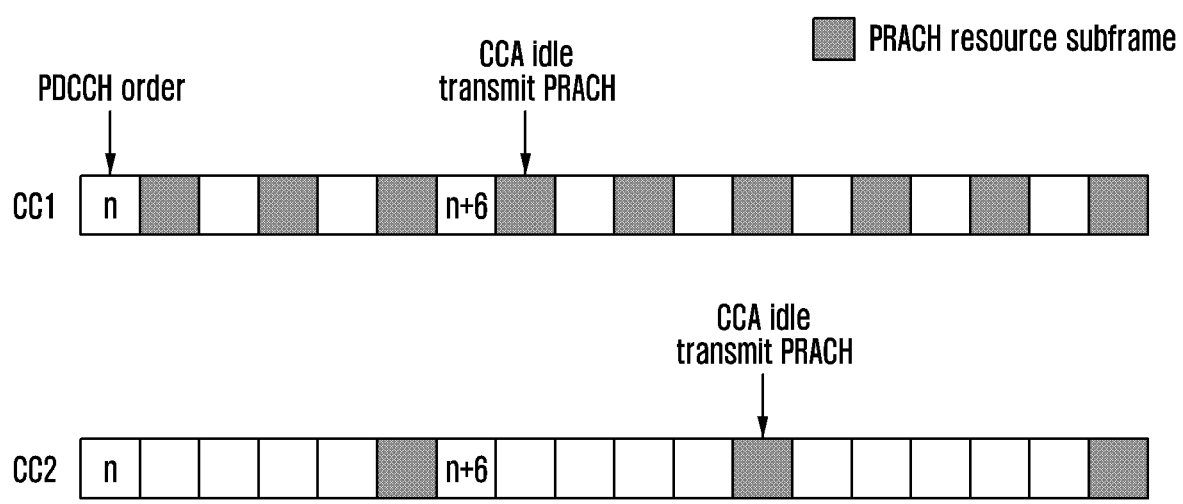
FIG. 12 is a schematic diagram illustrating to transmit the PRACH, based on idle conditions of PRACH resource subframe of each carrier, in accordance with an example of the second embodiment of the present disclosure.

A first mode may be as follows. When all the uplink carriers of the same TAG belong to unlicensed frequency bands, the UE may perform the CCA detection to all the uplink carriers of the same TAG. For each uplink carrier, the UE may respectively determine whether the first PRACH resource subframe after subframe (n+k) (k>=6) is idle. When determining that the first PRACH resource subframe after subframe (n+k) (k>=6) of an uplink carrier is idle, the UE may respectively transmit the PRACH on the uplink carrier, as shown in FIG. 12.

A second mode may be as follows. When all the uplink carriers of the same TAG belong to unlicensed frequency bands, the UE may perform the CCA detection to an uplink carrier configured within the TAG, and transmit the PRACH on multiple idle uplink carriers, based on configuration information. The configuration information may be transmitted by the base station through high-layer signaling, which may indicate a carrier capable of transmitting the PRACH.

For a carrier which does not transmit the PRACH, physical layer of the UE needs to report to the high level of the UE that the PRACH is not transmitted.

In block 802, under the circumstances that the UE receives a new PDCCH order in subframe j, before transmitting the PRACH, when the first PRACH resource subframe after subframe (n+k) (k>=6) of at least one uplink carrier is located after subframe j, the PRACH may be transmitted with two modes in the following.

A first mode may be as follows. For each subframe located before subframe (j+6), the UE may still perform the CCA detection, based on resources indicated by a previous PDCCH order, and transmit the PRACH when the subframe is idle. Starting from subframe (j+6), the UE may perform the CCA detection, based on resources indicated by the PDCCH order received in subframe j, and try to transmit the PRACH.

A second mode may be as follows. The UE may no longer try to transmit the PRACH, which is indicated by last PDCCH order. Instead, based on the PDCCH order received in subframe j, starting from subframe (j+6), the UE may perform the CCA detection, based on the resources indicated by the PDCCH order received in subframe j, and try to transmit the PRACH.

In block 803, when the UE transmits an uplink signal on at least one carrier, the UE may receive a random access response. When not receiving the random access response within a predefined time, the UE may re-transmit the uplink signal.

In the embodiment, the base station may try to receive the PRACH on multiple carriers. That is, the base station may try to receive the PRACH of a corresponding carrier in certain PRACH subframe, which is respectively determined by all the uplink carriers or configured uplink carriers of the triggered TAG. When allowing the UE to transmit the PRACH on one CC, the base station may expect to receive the PRACH signal on one carrier. After successfully receiving the PRACH transmitted by one carrier, the base station may stop trying to receive the PRACH on the other carriers. When allowing the UE to transmit the PRACH on multiple CCs, the base station may expect to receive the PRACH signal on the foregoing multiple carriers. After successfully receiving the PRACH from one carrier, the base station may stop trying to receive the PRACH from the other carriers, or may try to receive the PRACH on multiple carriers.

In the embodiment, the base station may re-trigger transmission of the PRACH, based on a specific scheduling algorithm. For example, under the circumstances that the PRACH resource subframe of each triggered uplink carrier is ended, when not detecting the PRACH signal coming from the UE, the base station may re-transmit the PDCCH order. Under the circumstances that the PRACH resource subframe of each of some uplink carriers is ended, when not detecting the PRACH signal from the UE, the base station may re-transmit the PDCCH order.

To avoid PRACH resource collision among different UEs, when allocating and scheduling the PRACH resources, the base station should avoid allocating the same PRACH resources for different users in subframes, which are on multiple carriers and probably to transmit the PRACH resources.

A Third Embodiment

Figure 13:
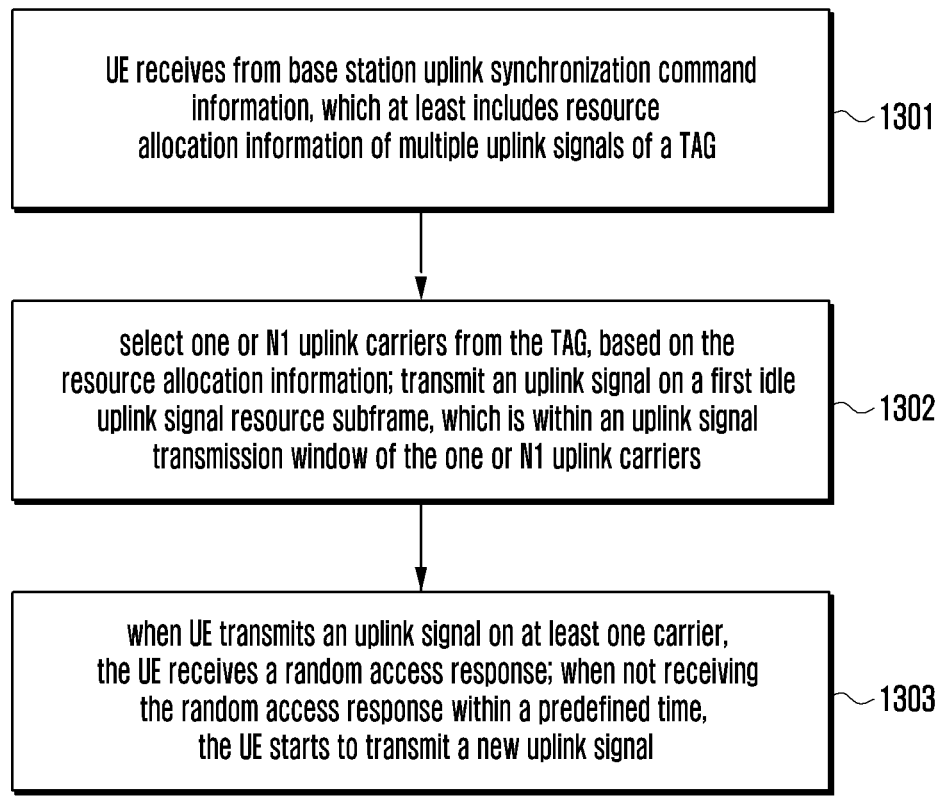
FIG. 13 is a flowchart illustrating a method for transmitting an uplink random access signal, in accordance with a third embodiment of the present disclosure.

The third embodiment takes into account of the first embodiment and the second embodiment. FIG. 13 is a flowchart illustrating a method for transmitting an uplink signal, in accordance with the third embodiment of the present disclosure, which may include the following blocks.

In block 1301, a UE may receive uplink synchronization command information from a base station. The uplink synchronization command information may at least include resource allocation information of uplink signals, which belong to multiple uplink carriers of a TAG.

In the embodiment, random access signal is still taken as an example for descriptions. The uplink synchronization command information may be the random access command information, which may be borne by the PDCCH order to be transmitted to the UE. Suppose the UE detects the PDCCH order in subframe n transmitted by the base station, in which the PDCCH order is born by the PDCCH or ePDCCH. The PDCCH order may employ the C-RNTI or group-RNTI to execute the CRC scrambling. The group-RNTI may be RNTI of a sTAG. The PDCCH order may be a cross-carrier scheduled, or a self-scheduled PDCCH/ePDCCH.

The PDCCH order may at least include resource allocation, which is used for establishing uplink synchronization signals of one TAG, e.g., PRACH preamble index and PRACH Mask index. Preferably, indication mode of the resource allocation may be either one of the following two methods.

A first method may be as follows. There is only one group of PRACH resource indication bits in the PDCCH order. Such group of PRACH resource indication bits may indicate PRACH resource allocation of multiple carriers, by using a predefined mode. A signaling-configured or predefined mapping rule may be employed, such as a predefined resource index offset. Specifically, there may be two implementation modes in the following.

a) The PRACH resources of uplink carrier i scheduled by the PDCCH order may be determined based on the resource index, which is indicated by the PDCCH order. The PRACH resources of the other carriers may be derived from the resource index of uplink carrier i, based on a signaling-configured or a predefined mapping rule. Take the predefined resource index offset as an example, when executing the cross-carrier scheduling, the PRACH preamble index and PRACH mask index of uplink carrier i, which corresponds to CIF=i of the PDCCH order, may be values indicated by the PDCCH order. However, another carrier may determine a corresponding resource index offset, based on a difference between index thereof and index of carrier i, so as to determine the PRACH resources of a corresponding carrier. When executing the self-scheduling, and detecting the PDCCH order on download carrier i, the PRACH preamble index and PRACH Mask index of uplink carrier i may be values indicated by the PDCCH order. Another carrier may determine a corresponding resource index offset, based on a difference between index thereof and index of carrier i, so as to determine the PRACH resources of a corresponding carrier.

b) The PRACH resources in the PDCCH order may belong to an uplink carrier with the smallest cell index in the TAG. The PRACH resources of other carriers may be derived from the resource index of the uplink carrier, based on the signaling-configured or predefined mapping rule. For example, another carrier may determine a corresponding resource index offset, based on a difference between index thereof and index of the carrier, so as to determine the PRACH resources of a corresponding carrier.

The carrier index in the method may be SCellIndex, or CIF, or other indexes, e.g., a carrier sort index within a TAG, or a sort index of each of configured multiple carriers, which may transmit the PRACH.

A second method may be as follows. In the PDCCH order, there may be multiple groups of PRACH resource indication bits, which may respectively indicate the PRACH resource allocation of multiple carriers. The multiple groups of PRACH resource indication bits may be sorted, based on a predefined sequence. For example, based on indexes of carriers within the TAG, or a pre-configured carrier sequence, the PRACH resource indication bits of the carrier may be sorted in sequence.

The PDCCH order may be group-specific indication signaling, to which group RNTI scrambling may be performed, e.g., group ID/group RNTI of the TAG.

In block 1302: select one or N1 uplink carriers from the TAG, based on the resource allocation information. Transmit an uplink signal in a first idle uplink signal resource subframe, which is within an uplink signal transmission window of the one or N1 uplink carriers. N1 is greater than or equal to 2.

In the embodiments of the present disclosure, descriptions are provided by taking the PRACH signal as an example. Corresponding relationship of each term may be as follows.

The "uplink signal transmission window" corresponds to the "PRACH transmission window" in the embodiment.

The "uplink signal resource subframe" corresponds to the "PRACH resource subframe" in the embodiment.

The "uplink signal" corresponds to the "PRACH" in the embodiment.

Based on the foregoing corresponding relationship, processes in the block are actually as follows. The UE may select at least one uplink carrier from the TAG, based on a set criterion. The UE may transmit the PRACH in a first idle PRACH resource subframe, which is within the PRACH transmission window of the at least one uplink carrier.

Meanings of the foregoing condition may be as follows. The subframe transmitting the PRACH is a PRACH resource subframe, which belongs to the PRACH resource subframe set and is within the PRACH transmission window.

Differences between block 1302 and block 802 of FIG. 8 may be as follows. In the block, the UE may try to transmit the PRACH within the PRACH transmission window several times. However, in block 802, the UE may have only one try.

The PRACH transmission window may be configured by a base station, or may be predefined. When the PRACH transmission window is configured by the base station, window length thereof may be configurable, or predefined. When the PRACH transmission window is predefined, the window length thereof is also predefined.

Starting point of the PRACH transmission window is a subframe where the PDCCH order is received. Alternatively, the starting point of the PRACH transmission window may be a first PRACH resource subframe after subframe (n+k). The PDCCH order is received in subframe n. K is greater than or equal to a set constant. Subsequent descriptions are provided, by taking k>=6 as an example.

The PRACH transmission window may be carrier specific. That is, the PRACH transmission window of each carrier may be configured independently. Alternatively, the PRACH transmission window may be UE specific. That is, the PRACH transmission window of each carrier of one UE is the same.

The starting point of the PRACH transmission window may be carrier specific. That is, for each carrier, the starting point of the PRACH transmission window is the first PRACH resource subframe after subframe (n+k). When PRACH resource subframe sets of different carriers are different, the starting point of the PRACH transmission window of a different carrier is also different. Alternatively, the starting point of the PRACH transmission window is UE specific. That is, for each carrier, the starting point of the PRACH transmission window is the same, e.g., take the subframe where the PDCCH order is received as the starting point, or take the first PRACH resource subframe after subframe (n+k) of a certain carrier as the starting point.

When selecting to transmit the PRACH on one uplink carrier, the following two methods may be employed.

A first method may be as follows. When all the uplink carriers of the same TAG belong to unlicensed frequency bands, the UE may respectively perform the CCA detection to each uplink carrier of the TAG within the PRACH transmission window, and select an idle uplink carrier to transmit the PRACH. When determining to transmit the PRACH on one carrier, the UE may stop the CCA detection performed to the other carriers.

Figure 14:
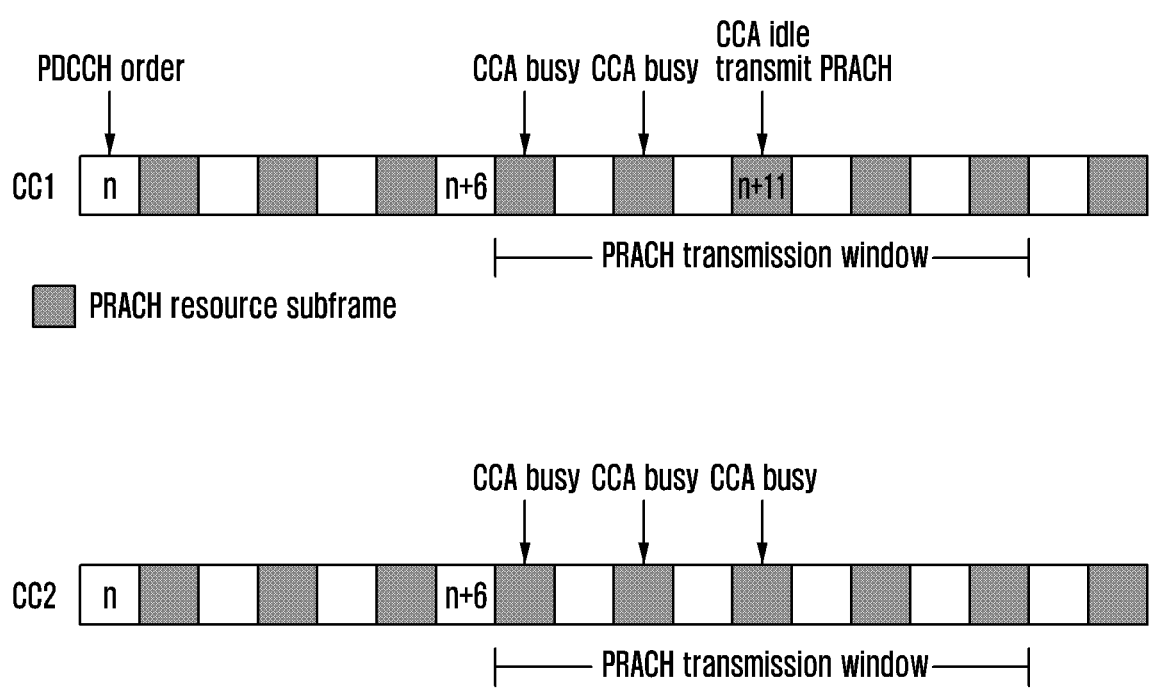
FIG. 14 is a schematic diagram illustrating that a UE selects an uplink carrier from idle uplink carriers of the same subframe to transmit the PRACH, when PRACH resource subframe sets of multiple carriers are the same, in accordance with an example of the third embodiment of the present disclosure.

When the PRACH resource subframe sets of multiple carriers are the same, the UE may select an uplink carrier from idle uplink carriers of a same subframe to transmit the PRACH, as shown in FIG. 14.

Figure 15:
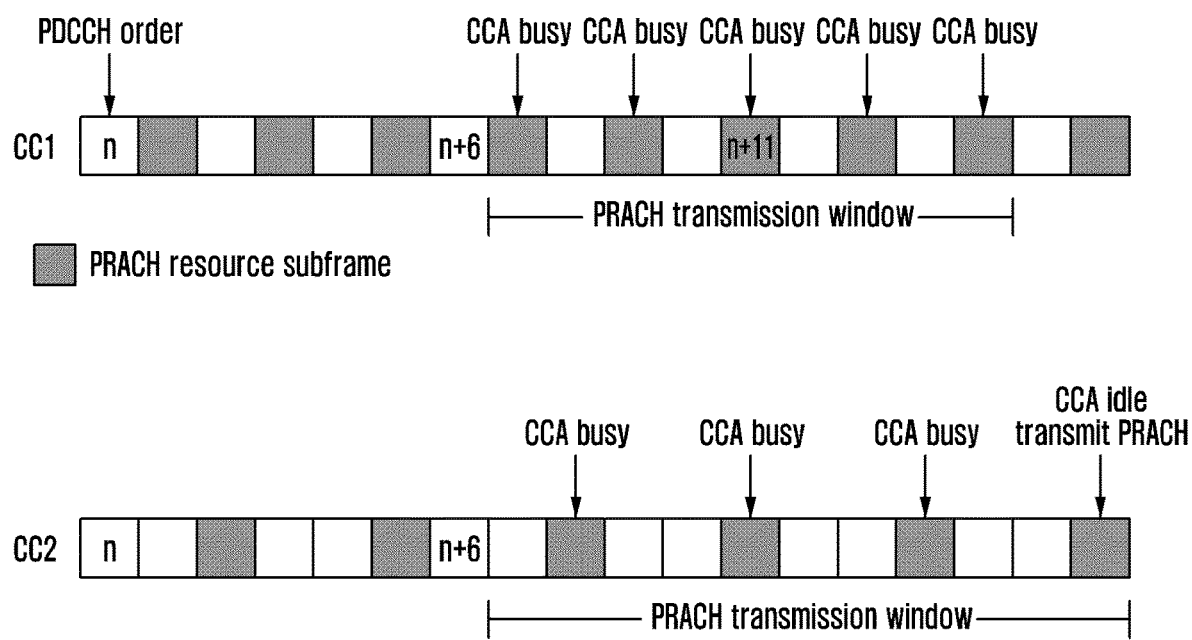
FIG. 15 is a schematic diagram illustrating that a UE selects a carrier with the earliest transmission time to transmit the PRACH, when PRACH resource subframe sets of multiple carriers are different, in accordance with an example of the third embodiment of the present disclosure.

When the PRACH resource subframe sets of multiple carriers are different, a carrier with the earliest transmission time may be selected firstly to transmit the PRACH, as shown in FIG. 15.

A second method may be as follows. When all the uplink carriers of the same TAG belong to unlicensed frequency bands, the UE may respectively perform the CCA detection to each uplink carrier of the TAG within the PRACH transmission window, and select an idle uplink carrier to transmit the PRACH, based on configuration information and a predefined priority. The predefined priority may be determined based on a configured priority, or based on sequence of carrier's index number.

There are two implementation modes, when selecting to transmit the PRACH on multiple uplink carriers.

Figure 16:
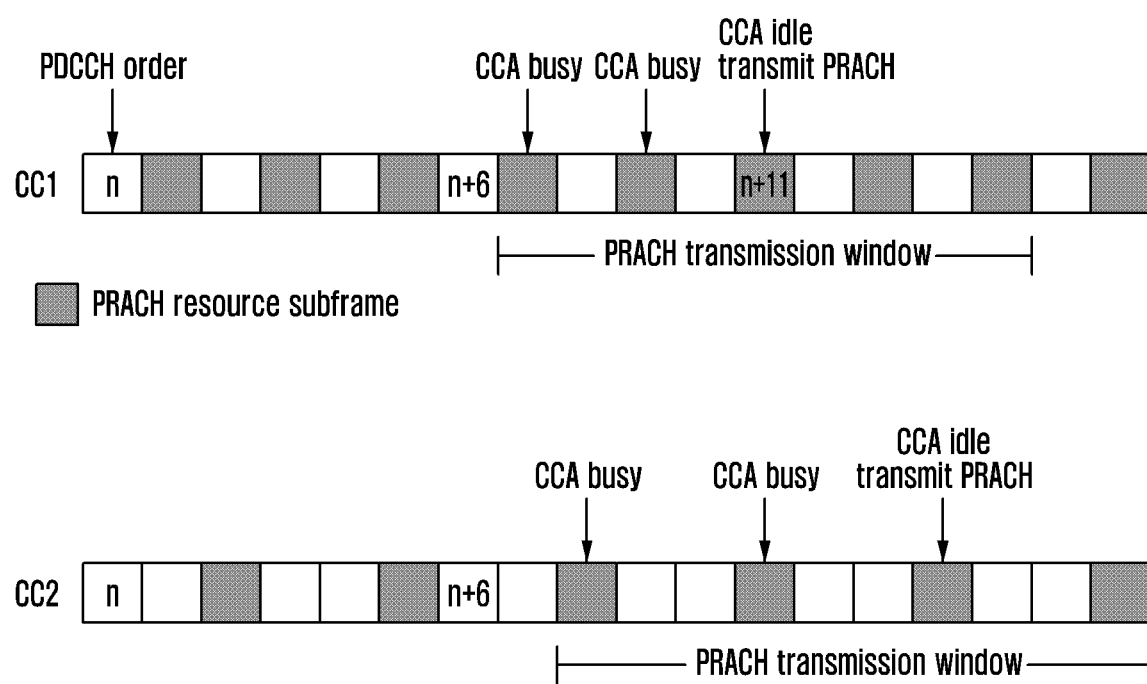
FIG. 16 is a schematic diagram illustrating to transmit the PRACH, based on idle conditions of PRACH resource subframe of each carrier, in accordance with an example of the third embodiment of the present disclosure.

A first method may be as follows. The UE may perform the CCA detection to each uplink carrier of the TAG within a corresponding PRACH transmission window, and transmit the PRACH on all the idle uplink carriers, as shown in FIG. 16.

A second method may be as follows. The UE may perform the CCA detection to each configured uplink carrier of the TAG, and transmit the PRACH on multiple idle uplink carriers within the PRACH transmission window, based on the configuration information. Configuration signaling may be transmitted by a base station through high-layer signaling, which is used for indicating carriers capable of transmitting the PRACH.

The UE may perform the CCA detection within the PRACH transmission window. When no idle carrier is detected in the PRACH resource subframe, until the end of the PRACH transmission window, the UE may give up transmitting the PRACH. Physical layer of the UE needs to report un-transmitted PRACH to high level of the UE.

In block 1302, when UE receives a new PDCCH order in subframe j, before transmitting the PRACH, there is at least one uplink carrier, the first PRACH resource subframe thereof starting from subframe (n+k) (k>=6) is located after subframe j, and then the following two modes may be employed to transmit the PRACH.

A first method may be as follows. Within a first PRACH transmission window before subframe (j+6), the UE may still perform the CCA detection in a corresponding subframe, based on resources indicated by a previous PDCCH order, and transmit the PRACH when the subframe is idle. Starting from the first PRACH resource subframe of subframe (j+6), the UE may perform the CCA detection within a second PRACH transmission window, based on the resources indicated by the PDCCH order received in subframe j, and try to transmit the PRACH.

A second method may be as follows. The UE may no longer try to transmit the PRACH, which is indicated by last PDCCH order. Instead, based on the PDCCH order received in subframe j, starting from the first PRACH resource subframe after subframe (j+6), the UE may perform the CCA detection within a new PRACH transmission window, based on the resources indicated by the PDCCH order received in subframe j, and try to transmit the PRACH.

In block 1303, when the UE transmits the PRACH on at least one carrier, the UE may receive a random access response. When no random access response is received within a predefined time, the UE may re-transmit the PRACH.

In the embodiment, the base station may try to receive the PRACH on multiple carriers within the PRACH transmission window. That is, the base station may try to receive the PRACH of a carrier in multiple PRACH subframes, which are within a respective PRACH transmission window of each uplink carrier, or each configured uplink carrier of the triggered TAG. When the UE is only allowed to transmit the PRACH on one CC, the base station may expect to receive the PRACH signal on one carrier. After successfully receiving the PRACH transmitted by one carrier, the base station may stop trying to receive the PRACH on the other carriers. When the UE is allowed to transmit the PRACH on multiple CCs, the base station may expect to receive the PRACH signal on foregoing multiple carriers at most. After successfully receiving the PRACH transmitted by one carrier, the base station may stop trying to receive the PRACH on the other carriers, or may try to receive the PRACH on multiple carriers.

In the embodiment, the base station may re-trigger transmission of the PRACH, based on a specific scheduling algorithm. For example, under the circumstances that the PRACH transmission window of each uplink carrier triggered by the base station is ended, when not detecting the PRACH signal from the UE, the base station may re-transmit the PDCCH order. Alternatively, when not detecting the PRACH signal from the UE before the end of the PRACH transmission widow, the base station may re-transmit the PDCCH order.

To avoid PRACH resource collision among different UEs, when allocating and scheduling the PRACH resources, the base station should avoid allocating the same PRACH resources for different users in each subframe of multiple carriers, which probably transmits the PRACH resources.

The method for transmitting an uplink signal in the present disclosure has been described in detail in the foregoing contents, by using three embodiments. For each embodiment, whether the UE transmits the uplink signal by using a conventional method, or by using a method in each embodiment may be semi-statically configured by high-layer signaling, or may be indicated in the uplink synchronization command information.

Regarding the foregoing three embodiments, the present disclosure respectively provides a corresponding UE and a corresponding base station device, which will be described in the following accompanying with attached figures.

Figure 17:
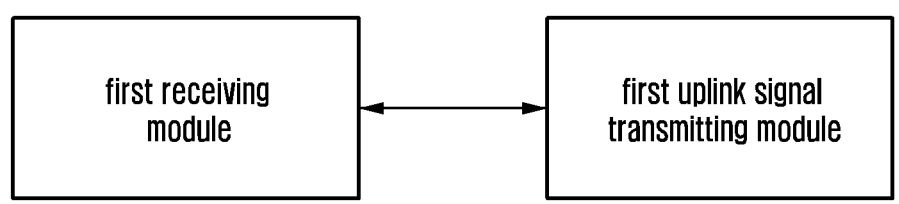
FIG. 17 is a schematic diagram illustrating structure of a UE, in accordance with the first embodiment of the present disclosure.

Structure of the UE corresponding to the first embodiment is shown in FIG. 17, which includes a first receiving module and a first uplink signal transmitting module.

The first receiving module is to receive uplink synchronization command information, which at least includes resource allocation information of uplink signals of one carrier.

The first uplink signal transmitting module is to transmit an uplink signal in a first idle uplink signal resource subframe, which is within an uplink signal transmission window of the uplink carrier, based on the resource allocation information.

Figure 18:
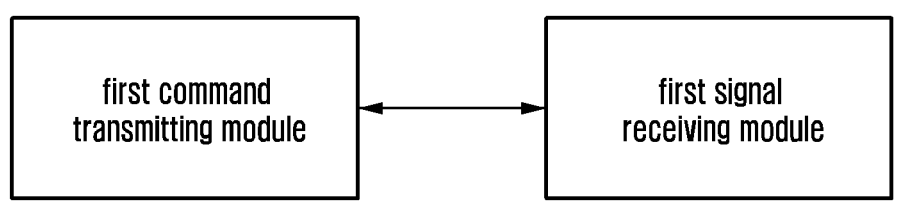
FIG. 18 is a schematic diagram illustrating structure of a base station, in accordance with the first embodiment of the present disclosure.

Structure of the base station corresponding to the first embodiment is shown in FIG. 18, which includes a first command transmitting module and a first signal receiving module.

The first command transmitting module is to transmit uplink synchronization command information, which at least includes resource allocation information of uplink signals of an uplink carrier.

The first signal receiving module is to receive an uplink signal in each uplink signal resource subframe, which is within an uplink signal transmission window of the uplink carrier scheduled, and stop continuously receiving the uplink signal within the uplink signal transmission window, after correctly receiving the uplink signal.

Figure 19:
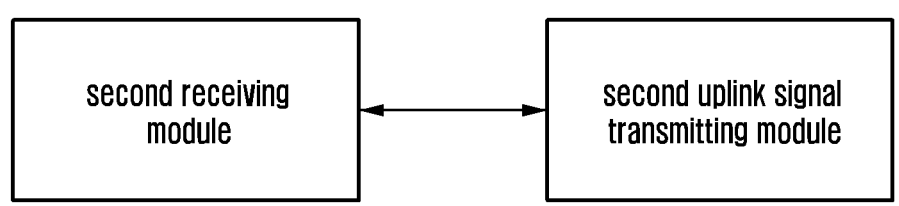
FIG. 19 is a schematic diagram illustrating structure of a UE, in accordance with the second embodiment of the present disclosure.

Structure of the UE corresponding to the second embodiment is shown in FIG. 19. The UE may include a second receiving module and a second uplink signal transmitting module.

The second receiving module is to receive uplink synchronization command information, which at least includes resource allocation information of uplink signals of N uplink carriers within one TAG. N is greater than or equal to 1.

The second uplink signal transmitting module is to select one or N1 uplink carriers from the TAG, based on the resource allocation information, and determine transmission of the uplink signal, by determining whether the first uplink signal resource subframe after subframe (n+k) of the one or N1 uplink carriers is idle. N1 is greater than or equal to 2. The uplink synchronization command information is received in subframe n. K is greater than or equal to a set constant.

Figure 20:
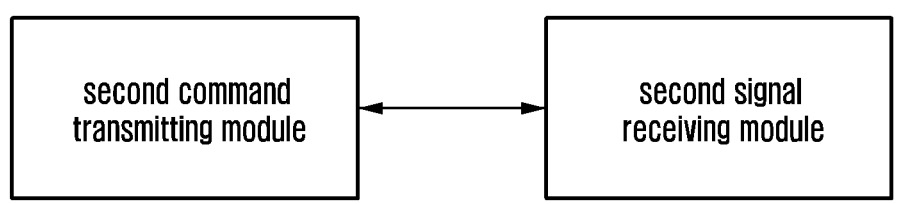
FIG. 20 is a schematic diagram illustrating structure of a base station, in accordance with the second embodiment of the present disclosure.

Structure of the base station corresponding to the second embodiment is shown in FIG. 20. The base station may include a second command transmitting module and a second signal receiving module.

The second command transmitting module is to transmit uplink synchronization command information, which at least includes resource allocation information of uplink signals of N uplink carriers about a TAG. N is greater than or equal to 1.

The second signal receiving module is to receive an uplink signal of a corresponding uplink carrier in an uplink signal resource subframe, which is respectively determined by all the uplink carriers, or configured uplink carriers of the same TAG. When allowing a UE to transmit an uplink signal on one uplink carrier, after correctly receiving the uplink signal of one uplink carrier, the second signal receiving module is further to stop receiving the uplink signal on the other uplink carriers. When allowing the UE to transmit the uplink signal on at least two uplink carriers, after correctly receiving the uplink signal of one uplink carrier, the second signal receiving module is further to stop receiving the uplink signal on the other uplink carriers, or continuously receive the uplink signal on the other uplink carriers.

Figure 21:
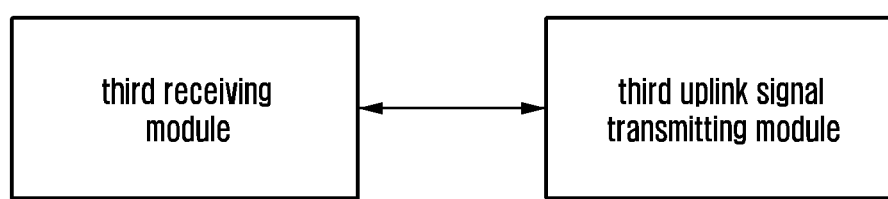
FIG. 21 is a schematic diagram illustrating structure of a UE, in accordance with the third embodiment of the present disclosure.

Structure of the UE corresponding to the third embodiment is shown in FIG. 21. The UE may include a third receiving module and a third uplink signal transmitting module.

The third receiving module is to receive uplink synchronization command information, which at least includes resource allocation information of uplink signals of N uplink carriers about a TAG. N is greater than or equal to 1.

The third uplink signal transmitting module is to select one or N1 uplink carriers from the TAG, based on the resource allocation information, and transmit an uplink signal in a first idle uplink signal resource subframe, which is within an uplink signal transmission window of the one or N1 uplink carriers. N1 is greater than or equal to 2.

Figure 22:
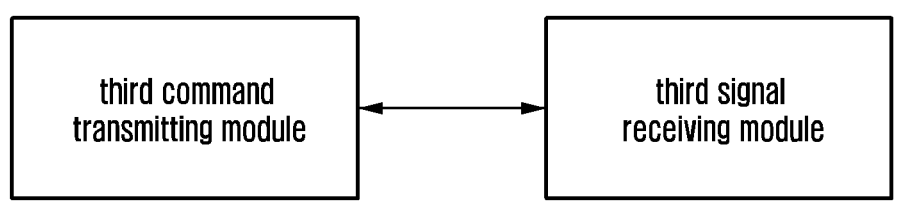
FIG. 22 is a schematic diagram illustrating structure of a base station, in accordance with the third embodiment of the present disclosure.

Structure of the base station corresponding to the third embodiment is shown in FIG. 22. The base station may include a third command transmitting module and a third signal receiving module.

The third command transmitting module is to transmit uplink synchronization command information, which at least includes resource allocation information of uplink signals of N uplink carriers about a TAG. N is greater than or equal to 1.

The third signal receiving module is to receive an uplink signal of a corresponding uplink carrier in an uplink signal resource subframe, which is within a respective uplink signal transmission window of all the uplink carriers, or configured uplink carriers of the same TAG. When allowing a UE to transmit an uplink signal on one uplink carrier, after correctly receiving the uplink signal of one uplink carrier, the third signal receiving module is further to stop receiving the uplink signal on the other uplink carriers. When allowing the UE to transmit the uplink signal on at least two uplink carriers, after correctly receiving the uplink signal of one uplink carrier, the third signal receiving module is further to stop receiving the uplink signal on the other uplink carriers, or continuously receiving the uplink signal on the other uplink carriers.

What is claimed is:

1. A method performed by a terminal for a random access procedure on an unlicensed frequency band in a wireless communication system, the method comprising:
    receiving, from a base station, first uplink synchronization command information;
    performing a first clear channel assessment (CCA) detection for a first uplink transmission window corresponding to the first uplink synchronization command information;
    receiving, from the base station, second uplink synchronization command information within the first uplink transmission window; and
    transmitting, to the base station, a random access preamble on a first idle subframe of a second uplink transmission window based on a second CCA detection.

2. The method of claim 1, wherein a window length of at least one of the first uplink transmission window or the second uplink transmission window is configured by a higher-layer signalling.

3. The method of claim 1, wherein, in case that the uplink synchronization command information is received on subframe n, a starting point of the uplink transmission window is a first subframe allocated for a random access preamble transmission after subframe n+k, where k is a predetermined value.

4. The method of claim 1, further comprising receiving, from the base station, a random access response corresponding to the random access preamble.

5. A method performed by a base station for a random access procedure on an unlicensed frequency band in a wireless communication system, the method comprising:
    transmitting, to a terminal, first uplink synchronization command information;
    transmitting, to the terminal, second uplink synchronization command information within a first uplink transmission window corresponding to the first uplink synchronization command information; and
    receiving, from the terminal, a random access preamble on a first idle subframe of a second uplink transmission window corresponding to the second uplink synchronization command information,
    wherein a first clear channel assessment (CCA) detection for the first uplink transmission window is stopped and a second CCA detection for the second uplink transmission window is performed, and
    wherein the first idle subframe of the second uplink transmission window is identified based on the second CCA detection.

6. The method of claim 5, wherein a window length of at least one of the first uplink transmission window or the second uplink transmission window is configured by a higher-layer signalling.

7. The method of claim 5, wherein, in case that the uplink synchronization command information is transmitted on subframe n, a starting point of the uplink transmission window is a first subframe allocated for a random access preamble transmission after subframe n+k, where k is a predetermined value.

8. The method of claim 5, further comprising transmitting, to the terminal, a random access response corresponding to the random access preamble.

9. A terminal for a random access procedure on an unlicensed frequency band in a wireless communication system, the terminal comprising:
    a transceiver; and
    a controller configured to:
        receive, from a base station via the transceiver, first uplink synchronization command information,
        perform a first clear channel assessment (CCA) detection for a first uplink transmission window corresponding to the first uplink synchronization command information,
        receive, from the base station via the transceiver, second uplink synchronization command information within the first uplink transmission window,
        perform a second CCA detection for a second uplink transmission window corresponding to the second uplink synchronization command information, wherein the first CCA detection is stopped, and
        transmit, to the base station via the transceiver, a random access preamble on a first idle subframe of the second uplink transmission window based on the second CCA detection.

10. The terminal of claim 9, wherein a window length of at least one of the first uplink transmission window or the second uplink transmission window is configured by a higher-layer signalling.

11. The terminal of claim 9, wherein, in case that the uplink synchronization command information is received on subframe n, a starting point of the uplink transmission window is a first subframe allocated for a random access preamble transmission after subframe n+k, where k is a predetermined value.

12. The terminal of claim 9, wherein the controller is further configured to receive, from the base station via the transceiver, a random access response corresponding to the random access preamble.

13. A base station for a random access procedure on an unlicensed frequency band in a wireless communication system, the base station comprising:
- a transceiver; and
- a controller configured to:
  - transmit, to a terminal via the transceiver, first uplink synchronization command information,
  - transmit, to the terminal via the transceiver, second uplink synchronization command information within a first uplink transmission window corresponding to the first uplink synchronization command information, and
  - receive, from the terminal via the transceiver, a random access preamble on a first idle subframe of a second uplink transmission window corresponding to the second uplink synchronization command information,
- wherein a first clear channel assessment (CCA) detection for the first uplink transmission window is stopped and a second CCA detection for the second uplink transmission window is performed, and
- wherein the first idle subframe of the second uplink transmission window is identified based on the second CCA detection.

14. The base station of claim 13, wherein a window length of at least one of the first uplink transmission window or the second uplink transmission window is configured by a higher-layer signalling.

15. The base station of claim 13, wherein, in case that the uplink synchronization command information is transmitted on subframe n, a starting point of the uplink transmission window is a first subframe allocated for a random access preamble transmission after subframe n+k, where k is a predetermined value.

16. The base station of claim 13, wherein the controller is further configured to transmit, to the terminal via the transceiver, a random access response corresponding to the random access preamble.

* * * * *